(12) United States Patent
Lutnick

(10) Patent No.: US 8,407,101 B2
(45) Date of Patent: Mar. 26, 2013

(54) MULTI-SYSTEM DISTRIBUTED PROCESSING OF DELIVERY SERVICES

(75) Inventor: Howard W. Lutnick, New York, NY (US)

(73) Assignee: CFPH, LLC, New York, NY (US)

( * ) Notice: Subject to any disclaimer, the term of this patent is extended or adjusted under 35 U.S.C. 154(b) by 84 days.

(21) Appl. No.: 12/757,316

(22) Filed: Apr. 9, 2010

(65) Prior Publication Data

US 2011/0251915 A1    Oct. 13, 2011

(51) Int. Cl.
*G06Q 30/00*    (2012.01)
*G06F 17/30*    (2006.01)

(52) U.S. Cl. .............. 705/26.3; 705/26.1; 705/26.4

(58) Field of Classification Search ........ 705/26.1–27.2, 705/330–348
See application file for complete search history.

(56) References Cited

U.S. PATENT DOCUMENTS

| | | | |
|---|---|---|---|
| 6,574,608 B1* | 6/2003 | Dahod et al. ............... | 705/26.41 |
| 2002/0049642 A1* | 4/2002 | Moderegger et al. ........... | 705/26 |
| 2003/0208420 A1* | 11/2003 | Kansal ............................ | 705/34 |
| 2004/0078277 A1* | 4/2004 | Gindlesperger ............... | 705/26 |
| 2005/0004843 A1* | 1/2005 | Heflin ............................ | 705/15 |
| 2005/0216364 A1* | 9/2005 | Jurisic et al. .................... | 705/26 |
| 2006/0085318 A1* | 4/2006 | Cohoon .......................... | 705/37 |
| 2007/0016487 A1* | 1/2007 | Calonge ......................... | 705/26 |
| 2007/0150375 A1* | 6/2007 | Yang ............................... | 705/26 |
| 2007/0185776 A1* | 8/2007 | Nguyen et al. .................. | 705/26 |
| 2007/0233510 A1* | 10/2007 | Howes .............................. | 705/1 |
| 2008/0270230 A1* | 10/2008 | Hendrickson et al. .......... | 705/14 |
| 2008/0306853 A1* | 12/2008 | McLemore et al. ............ | 705/37 |
| 2009/0048890 A1* | 2/2009 | Burgh ............................... | 705/8 |
| 2009/0099972 A1* | 4/2009 | Angert et al. .................... | 705/80 |
| 2009/0187489 A1* | 7/2009 | Mallick et al. ................... | 705/26 |
| 2010/0125494 A1* | 5/2010 | Boss et al. ................ | 705/14.19 |
| 2011/0022492 A1* | 1/2011 | Karaoguz et al. ............. | 705/26.4 |
| 2011/0161192 A1* | 6/2011 | Moderegger et al. ........ | 705/26.3 |

OTHER PUBLICATIONS deliveryquotecompare.com    http://deliveryquotecompare.com/ Internet Archive (Jan. 2, 2010)—http://web.archive.org/web/20100102060822/http://www.deliveryquotecompare.com/.*

* cited by examiner

*Primary Examiner* — Peter Choi
*Assistant Examiner* — Kathleen G Palavecino
(74) *Attorney, Agent, or Firm* — Mark Miller

(57) ABSTRACT

Various systems and methods that may relate to referral and/or delivery services are described. Some embodiments may include communication using a payment processing device. Various other embodiments are described.

29 Claims, 10 Drawing Sheets

MULTI-SYSTEM DISTRIBUTED PROCESSING OF DELIVERY SERVICES

DETAILED DESCRIPTION

Figure 1:
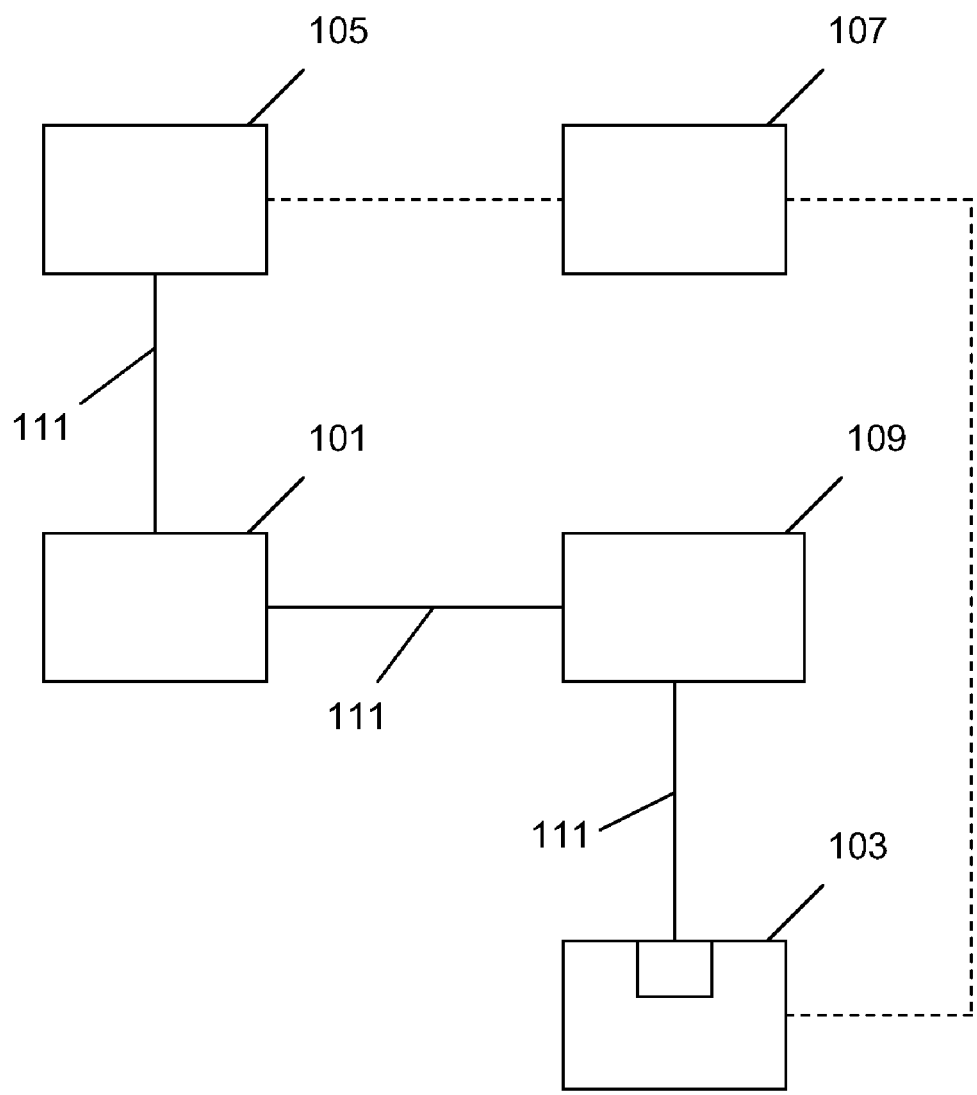
FIG. 1 depicts a system according to at least one embodiment of the systems disclosed herein.

The following sections I-X provide a guide to interpreting the present application.

I. Terms

The term "product" means any machine, manufacture and/or composition of matter, unless expressly specified otherwise.

The term "process" means any process, algorithm, method or the like, unless expressly specified otherwise.

Each process (whether called a method, algorithm or otherwise) inherently includes one or more steps, and therefore all references to a "step" or "steps" of a process have an inherent antecedent basis in the mere recitation of the term 'process' or a like term. Accordingly, any reference in a claim to a 'step' or 'steps' of a process has sufficient antecedent basis.

The term "invention" and the like mean "the one or more inventions disclosed in this application", unless expressly specified otherwise.

The terms "an embodiment", "embodiment", "embodiments", "the embodiment", "the embodiments", "one or more embodiments", "some embodiments", "certain embodiments", "one embodiment", "another embodiment" and the like mean "one or more (but not all) embodiments of the disclosed invention(s)", unless expressly specified otherwise.

The term "variation" of an invention means an embodiment of the invention, unless expressly specified otherwise.

A reference to "another embodiment" in describing an embodiment does not imply that the referenced embodiment is mutually exclusive with another embodiment (e.g., an embodiment described before the referenced embodiment), unless expressly specified otherwise.

The terms "including", "comprising" and variations thereof mean "including but not necessarily limited to", unless expressly specified otherwise. Thus, for example, the sentence "the portfolio includes a red widget and a blue widget" means the portfolio includes the red widget and the blue widget, but may include something else.

The term "consisting of" and variations thereof means "including and limited to", unless expressly specified otherwise. Thus, for example, the sentence "the portfolio consists of a red widget and a blue widget" means the portfolio includes the red widget and the blue widget, but does not include anything else.

The term "compose" and variations thereof means "to make up the constituent parts of, component of or member of", unless expressly specified otherwise. Thus, for example, the sentence "the red widget and the blue widget compose a portfolio" means the portfolio includes the red widget and the blue widget.

The term "exclusively compose" and variations thereof means "to make up exclusively the constituent parts of, to be the only components of or to be the only members of", unless expressly specified otherwise. Thus, for example, the sentence "the red widget and the blue widget exclusively compose a portfolio" means the portfolio consists of the red widget and the blue widget, and nothing else.

The terms "a", "an" and "the" mean "one or more", unless expressly specified otherwise.

The term "plurality" means "two or more", unless expressly specified otherwise.

The term "herein" means "in the present application, including anything which may be incorporated by reference", unless expressly specified otherwise.

The phrase "at least one of", when such phrase modifies a plurality of things (such as an enumerated list of things) means any combination of one or more of those things, unless expressly specified otherwise. For example, the phrase "at least one of a widget, a car and a wheel" means either (i) a widget, (ii) a car, (iii) a wheel, (iv) a widget and a car, (v) a widget and a wheel, (vi) a car and a wheel, or (vii) a widget, a car and a wheel. The phrase "at least one of", when such phrase modifies a plurality of things does not mean "one of each of" the plurality of things.

Numerical terms such as "one", "two", etc. when used as cardinal numbers to indicate quantity of something (e.g., one widget, two widgets), mean the quantity indicated by that numerical term, but do not mean at least the quantity indicated by that numerical term. For example, the phrase "one widget" does not mean "at least one widget", and therefore the phrase "one widget" does not cover, e.g., two widgets.

The phrase "based on" does not mean "based only on", unless expressly specified otherwise. In other words, the phrase "based on" describes both "based only on" and "based at least on". The phrase "based at least on" is equivalent to the phrase "based at least in part on".

The term "represent" and like terms are not exclusive, unless expressly specified otherwise. For example, the term "represents" does not mean "represents only", unless expressly specified otherwise. In other words, the phrase "the data represents a credit card number" describes both "the data represents only a credit card number" and "the data represents a credit card number and the data also represents something else".

The term "whereby" is used herein only to precede a clause or other set of words that express only the intended result, objective or consequence of something that is previously and explicitly recited. Thus, when the term "whereby" is used in a claim, the clause or other words that the term "whereby" modifies do not establish specific further limitations of the claim or otherwise restricts the meaning or scope of the claim.

The term "e.g." and like terms mean "for example", and thus does not limit the term or phrase it explains. For example, in the sentence "the computer sends data (e.g., instructions, a data structure) over the Internet", the term "e.g." explains that "instructions" are an example of "data" that the computer may send over the Internet, and also explains that "a data structure" is an example of "data" that the computer may send over the Internet. However, both "instructions" and "a data structure" are merely examples of "data", and other things besides "instructions" and "a data structure" can be "data".

The term "respective" and like terms mean "taken individually". Thus if two or more things have "respective" characteristics, then each such thing has its own characteristic, and these characteristics can be different from each other but need not be. For example, the phrase "each of two machines has a respective function" means that the first such machine has a function and the second such machine has a function as well. The function of the first machine may or may not be the same as the function of the second machine.

The term "i.e." and like terms mean "that is", and thus limits the term or phrase it explains. For example, in the sentence "the computer sends data (i.e., instructions) over the Internet", the term "i.e." explains that "instructions" are the "data" that the computer sends over the Internet.

Any given numerical range shall include whole and fractions of numbers within the range. For example, the range "1 to 10" shall be interpreted to specifically include whole numbers between 1 and 10 (e.g., 1, 2, 3, 4, . . . 9) and non-whole numbers (e.g., 1.1, 1.2, . . . 1.9).

Where two or more terms or phrases are synonymous (e.g., because of an explicit statement that the terms or phrases are synonymous), instances of one such term/phrase does not mean instances of another such term/phrase must have a different meaning. For example, where a statement renders the meaning of "including" to be synonymous with "including but not limited to", the mere usage of the phrase "including but not limited to" does not mean that the term "including" means something other than "including but not limited to".

II. Determining

The term "determining" and grammatical variants thereof (e.g., to determine a price, determining a value, determine an object which meets a certain criterion) is used in an extremely broad sense. The term "determining" encompasses a wide variety of actions and therefore "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing, and the like.

The term "determining" does not imply certainty or absolute precision, and therefore "determining" can include estimating, extrapolating, predicting, guessing and the like.

The term "determining" does not imply that mathematical processing must be performed, and does not imply that numerical methods must be used, and does not imply that an algorithm or process is used.

The term "determining" does not imply that any particular device must be used. For example, a computer need not necessarily perform the determining.

III. Forms of Sentences

Where a limitation of a first claim would cover one of a feature as well as more than one of a feature (e.g., a limitation such as "at least one widget" covers one widget as well as more than one widget), and where in a second claim that depends on the first claim, the second claim uses a definite article "the" to refer to the limitation (e.g., "the widget"), this does not imply that the first claim covers only one of the feature, and this does not imply that the second claim covers only one of the feature (e.g., "the widget" can cover both one widget and more than one widget).

When an ordinal number (such as "first", "second", "third" and so on) is used as an adjective before a term, that ordinal number is used (unless expressly specified otherwise) merely to indicate a particular feature, such as to distinguish that particular feature from another feature that is described by the same term or by a similar term. For example, a "first widget" may be so named merely to distinguish it from, e.g., a "second widget". Thus, the mere usage of the ordinal numbers "first" and "second" before the term "widget" does not indicate any other relationship between the two widgets, and likewise does not indicate any other characteristics of either or both widgets. For example, the mere usage of the ordinal numbers "first" and "second" before the term "widget" (1) does not indicate that either widget comes before or after any other in order or location; (2) does not indicate that either widget occurs or acts before or after any other in time; and (3) does not indicate that either widget ranks above or below any other, as in importance or quality. In addition, the mere usage of ordinal numbers does not define a numerical limit to the features identified with the ordinal numbers. For example, the mere usage of the ordinal numbers "first" and "second" before the term "widget" does not indicate that there must be no more than two widgets.

When a single device, article or other product is described herein, more than one device/article (whether or not they cooperate) may alternatively be used in place of the single device/article that is described. Accordingly, the functionality that is described as being possessed by a device may alternatively be possessed by more than one device/article (whether or not they cooperate).

Similarly, where more than one device, article or other product is described herein (whether or not they cooperate), a single device/article may alternatively be used in place of the more than one device or article that is described. For example, a plurality of computer-based devices may be substituted with a single computer-based device. Accordingly, the various functionality that is described as being possessed by more than one device or article may alternatively be possessed by a single device/article.

The functionality and/or the features of a single device that is described may be alternatively embodied by one or more other devices which are described but are not explicitly described as having such functionality/features. Thus, other embodiments need not include the described device itself, but rather can include the one or more other devices which would, in those other embodiments, have such functionality/features.

IV. Disclosed Examples and Terminology are Not Limiting

Neither the Title (set forth at the beginning of the first page of the present application) nor the Abstract (set forth at the end of the present application) is to be taken as limiting in any way as the scope of the disclosed invention(s), is to be used in interpreting the meaning of any claim or is to be used in limiting the scope of any claim. An Abstract has been included in this application merely because an Abstract is required under 37 C.F.R. §1.72(b).

The title of the present application and headings of sections provided in the present application are for convenience only, and are not to be taken as limiting the disclosure in any way.

Numerous embodiments are described in the present application, and are presented for illustrative purposes only. The described embodiments are not, and are not intended to be, limiting in any sense. The presently disclosed invention(s) are widely applicable to numerous embodiments, as is readily apparent from the disclosure. One of ordinary skill in the art will recognize that the disclosed invention(s) may be practiced with various modifications and alterations, such as structural, logical, software, and electrical modifications. Although particular features of the disclosed invention(s) may be described with reference to one or more particular embodiments and/or drawings, it should be understood that such features are not limited to usage in the one or more particular embodiments or drawings with reference to which they are described, unless expressly specified otherwise.

Though an embodiment may be disclosed as including several features, other embodiments of the invention may include fewer than all such features. Thus, for example, a claim may be directed to less than the entire set of features in a disclosed embodiment, and such claim would not include features beyond those features that the claim expressly recites.

No embodiment of method steps or product elements described in the present application constitutes the invention claimed herein, or is essential to the invention claimed herein, or is coextensive with the invention claimed herein, except where it is either expressly stated to be so in this specification or expressly recited in a claim.

The preambles of the claims that follow recite purposes, benefits and possible uses of the claimed invention only and do not limit the claimed invention.

The present disclosure is not a literal description of all embodiments of the invention(s). Also, the present disclosure is not a listing of features of the invention(s) which must be present in all embodiments.

All disclosed embodiment are not necessarily covered by the claims (even including all pending, amended, issued and canceled claims). In addition, an embodiment may be (but need not necessarily be) covered by several claims. Accordingly, where a claim (regardless of whether pending, amended, issued or canceled) is directed to a particular embodiment, such is not evidence that the scope of other claims do not also cover that embodiment.

Devices that are described as in communication with each other need not be in continuous communication with each other, unless expressly specified otherwise. On the contrary, such devices need only transmit to each other as necessary or desirable, and may actually refrain from exchanging data most of the time. For example, a machine in communication with another machine via the Internet may not transmit data to the other machine for long period of time (e.g. weeks at a time). In addition, devices that are in communication with each other may communicate directly or indirectly through one or more intermediaries.

A description of an embodiment with several components or features does not imply that all or even any of such components/features are required. On the contrary, a variety of optional components are described to illustrate the wide variety of possible embodiments of the present invention(s). Unless otherwise specified explicitly, no component/feature is essential or required.

Although process steps, algorithms or the like may be described or claimed in a particular sequential order, such processes may be configured to work in different orders. In other words, any sequence or order of steps that may be explicitly described or claimed does not necessarily indicate a requirement that the steps be performed in that order. The steps of processes described herein may be performed in any order possible. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to the invention(s), and does not imply that the illustrated process is preferred.

Although a process may be described as including a plurality of steps, that does not imply that all or any of the steps are preferred, essential or required. Various other embodiments within the scope of the described invention(s) include other processes that omit some or all of the described steps. Unless otherwise specified explicitly, no step is essential or required.

Although a process may be described singly or without reference to other products or methods, in an embodiment the process may interact with other products or methods. For example, such interaction may include linking one business model to another business model. Such interaction may be provided to enhance the flexibility or desirability of the process.

Although a product may be described as including a plurality of components, aspects, qualities, characteristics and/or features, that does not indicate that any or all of the plurality are preferred, essential or required. Various other embodiments within the scope of the described invention(s) include other products that omit some or all of the described plurality.

An enumerated list of items (which may or may not be numbered) does not imply that any or all of the items are mutually exclusive, unless expressly specified otherwise. Likewise, an enumerated list of items (which may or may not be numbered) does not imply that any or all of the items are comprehensive of any category, unless expressly specified otherwise. For example, the enumerated list "a computer, a laptop, a PDA" does not imply that any or all of the three items of that list are mutually exclusive and does not imply that any or all of the three items of that list are comprehensive of any category.

An enumerated list of items (which may or may not be numbered) does not imply that any or all of the items are equivalent to each other or readily substituted for each other.

All embodiments are illustrative, and do not imply that the invention or any embodiments were made or performed, as the case may be.

V. Computing

It will be readily apparent to one of ordinary skill in the art that the various processes described herein may be implemented by, e.g., appropriately programmed general purpose computers, special purpose computers and computing devices. Typically a processor (e.g., one or more microprocessors, one or more microcontrollers, one or more digital signal processors) will receive instructions (e.g., from a memory or like device), and execute those instructions, thereby performing one or more processes defined by those instructions. Instructions may be embodied in, e.g., one or more computer programs, one or more scripts.

A "processor" means one or more microprocessors, central processing units (CPUs), computing devices, microcontrollers, digital signal processors, or like devices or any combination thereof, regardless of the architecture (e.g., chip-level multiprocessing/multi-core, RISC, CISC, Microprocessor without Interlocked Pipeline Stages, pipelining configuration, simultaneous multithreading).

Thus a description of a process is likewise a description of an apparatus for performing the process. The apparatus that performs the process can include, e.g., a processor and those input devices and output devices that are appropriate to perform the process.

Further, programs that implement such methods (as well as other types of data) may be stored and transmitted using a variety of media (e.g., computer readable media) in a number of manners. In some embodiments, hard-wired circuitry or custom hardware may be used in place of, or in combination with, some or all of the software instructions that can implement the processes of various embodiments. Thus, various combinations of hardware and software may be used instead of software only.

The term "computer-readable medium" refers to any medium, a plurality of the same, or a combination of different media, that participate in providing data (e.g., instructions, data structures) which may be read by a computer, a processor or a like device. Such a medium may take many forms, including but not limited to, non-volatile media, volatile media, and transmission media. Non-volatile media include, for example, optical or magnetic disks and other persistent memory. Volatile media include dynamic random access memory (DRAM), which typically constitutes the main memory. Transmission media include coaxial cables, copper wire and fiber optics, including the wires that comprise a system bus coupled to the processor. Transmission media may include or convey acoustic waves, light waves and electromagnetic emissions, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave as described hereinafter, or any other medium from which a computer can read.

Various forms of computer readable media may be involved in carrying data (e.g. sequences of instructions) to a processor. For example, data may be (i) delivered from RAM to a processor; (ii) carried over a wireless transmission medium; (iii) formatted and/or transmitted according to numerous formats, standards or protocols, such as Ethernet (or IEEE 802.3), SAP, ATP, Bluetooth□, and TCP/IP, TDMA, CDMA, and 3G; and/or (iv) encrypted to ensure privacy or prevent fraud in any of a variety of ways well known in the art.

Thus a description of a process is likewise a description of a computer-readable medium storing a program for performing the process. The computer-readable medium can store (in any appropriate format) those program elements which are appropriate to perform the method.

Just as the description of various steps in a process does not indicate that all the described steps are required, embodiments of an apparatus include a computer/computing device operable to perform some (but not necessarily all) of the described process.

Likewise, just as the description of various steps in a process does not indicate that all the described steps are required, embodiments of a computer-readable medium storing a program or data structure include a computer-readable medium storing a program that, when executed, can cause a processor to perform some (but not necessarily all) of the described process.

Where databases are described, it will be understood by one of ordinary skill in the art that (i) alternative database structures to those described may be readily employed, and (ii) other memory structures besides databases may be readily employed. Any illustrations or descriptions of any sample databases presented herein are illustrative arrangements for stored representations of information. Any number of other arrangements may be employed besides those suggested by, e.g., tables illustrated in drawings or elsewhere. Similarly, any illustrated entries of the databases represent exemplary information only; one of ordinary skill in the art will understand that the number and content of the entries can be different from those described herein. Further, despite any depiction of the databases as tables, other formats (including relational databases, object-based models and/or distributed databases) could be used to store and manipulate the data types described herein Likewise, object methods or behaviors of a database can be used to implement various processes, such as the described herein. In addition, the databases may, in a known manner, be stored locally or remotely from a device which accesses data in such a database.

Various embodiments can be configured to work in a network environment including a computer that is in communication (e.g., via a communications network) with one or more devices. The computer may communicate with the devices directly or indirectly, via any wired or wireless medium (e.g. the Internet, LAN, WAN or Ethernet, Token Ring, a telephone line, a cable line, a radio channel, an optical communications line, commercial on-line service providers, bulletin board systems, a satellite communications link, a combination of any of the above). Each of the devices may themselves comprise computers or other computing devices, such as those based on the Intel® Pentium® or Centrino™ processor, that are adapted to communicate with the computer. Any number and type of devices may be in communication with the computer.

In an embodiment, a server computer or centralized authority may not be necessary or desirable. For example, the present invention may, in an embodiment, be practiced on one or more devices without a central authority. In such an embodiment, any functions described herein as performed by the server computer or data described as stored on the server computer may instead be performed by or stored on one or more such devices.

Where a process is described, in an embodiment the process may operate without any user intervention. In another embodiment, the process includes some human intervention (e.g., a step is performed by or with the assistance of a human).

VI. Continuing Applications

The present disclosure provides, to one of ordinary skill in the art, an enabling description of several embodiments and/or inventions. Some of these embodiments and/or inventions may not be claimed in the present application, but may nevertheless be claimed in one or more continuing applications that claim the benefit of priority of the present application.

Applicants intend to file additional applications to pursue patents for subject matter that has been disclosed and enabled but not claimed in the present application.

VII. 35 U.S.C. §112, Paragraph 6

In a claim, a limitation of the claim which includes the phrase "means for" or the phrase "step for" means that 35 U.S.C. §112, paragraph 6, applies to that limitation.

In a claim, a limitation of the claim which does not include the phrase "means for" or the phrase "step for" means that 35 U.S.C. §112, paragraph 6 does not apply to that limitation, regardless of whether that limitation recites a function without recitation of structure, material or acts for performing that function. For example, in a claim, the mere use of the phrase "step of" or the phrase "steps of" in referring to one or more steps of the claim or of another claim does not mean that 35 U.S.C. §112, paragraph 6, applies to that step(s).

With respect to a means or a step for performing a specified function in accordance with 35 U.S.C. §112, paragraph 6, the corresponding structure, material or acts described in the specification, and equivalents thereof, may perform additional functions as well as the specified function.

Computers, processors, computing devices and like products are structures that can perform a wide variety of functions. Such products can be operable to perform a specified function by executing one or more programs, such as a program stored in a memory device of that product or in a memory device which that product accesses. Unless expressly specified otherwise, such a program need not be based on any particular algorithm, such as any particular algorithm that might be disclosed in the present application. It is well known to one of ordinary skill in the art that a specified function may be implemented via different algorithms, and any of a number of different algorithms would be a mere design choice for carrying out the specified function.

Therefore, with respect to a means or a step for performing a specified function in accordance with 35 U.S.C. §112, paragraph 6, structure corresponding to a specified function includes any product programmed to perform the specified function. Such structure includes programmed products which perform the function, regardless of whether such product is programmed with (i) a disclosed algorithm for performing the function, (ii) an algorithm that is similar to a disclosed algorithm, or (iii) a different algorithm for performing the function.

Where there is recited a means for performing a function that is a method, one structure for performing this method includes a computing device (e.g., a general purpose computer) that is programmed and/or configured with appropriate hardware to perform that function.

Also included is a computing device (e.g., a general purpose computer) that is programmed and/or configured with appropriate hardware to perform that function via other algorithms as would be understood by one of ordinary skill in the art.

VIII. Disclaimer

Numerous references to a particular embodiment do not indicate a disclaimer or disavowal of additional, different embodiments, and similarly references to the description of embodiments which all include a particular feature do not indicate a disclaimer or disavowal of embodiments which do not include that particular feature. A clear disclaimer or disavowal in the present application shall be prefaced by the phrase "does not include" or by the phrase "cannot perform".

IX. Incorporation by Reference

Any patent, patent application or other document referred to herein is incorporated by reference into this patent application as part of the present disclosure, but only for purposes of written description and enablement in accordance with 35 U.S.C. §112, paragraph 1, and should in no way be used to limit, define, or otherwise construe any term of the present application, unless without such incorporation by reference, no ordinary meaning would have been ascertainable by a person of ordinary skill in the art. Such person of ordinary skill in the art need not have been in any way limited by any embodiments provided in the reference Any incorporation by reference does not, in and of itself, imply any endorsement of, ratification of or acquiescence in any statements, opinions, arguments or characterizations contained in any incorporated patent, patent application or other document, unless explicitly specified otherwise in this patent application.

X. Prosecution History

In interpreting the present application (which includes the claims), one of ordinary skill in the art shall refer to the prosecution history of the present application, but not to the prosecution history of any other patent or patent application, regardless of whether there are other patent applications that are considered related to the present application, and regardless of whether there are other patent applications that share a claim of priority with the present application.

XI. Example Embodiments

U.S. patent publication 2008/0161944 entitle Method and Apparatus for Group Filtered Reports, U.S. patent publication 2008/0195538 entitled Payment During Trial Period of Referral Service, U.S. patent publication 2009/0083135 entitled Products and Processes for Revenue Sharing, and U.S. patent publication 2009/0083324 entitled Method and Apparatus for Menu Generation and all hereby incorporated herein by reference.

It is recognized that communication (e.g., one way and/or two way) with a merchant may be desirable in some embodiments. For example, order information may be transmitted to a merchant, confirmation information may be transmitted from a merchant, time estimate information may be transmitted from a merchant, time request information may be transmitted to a merchant, payment information may be transmitted to a merchant, special request information may be transmitted to the merchant, credit authorization may be transmitted to the merchant, reservation information may be transmitted to/from a merchant, delivery information, and so on. Such information may be transmitted to and/or from a communication device associated with the merchant. A merchant for example, may include a restaurant.

It is recognized that in some embodiments a merchant may have space constraints in an area in which a communication device is desired. For example, a communication device may be desired in a kitchen area in which space is at a premium, a communication device may be desired at a counter area near where a host or hostess works, a communication device may be desired near a cash register to process payment information, and so on. In some embodiments, a merchant may already have one or more devices in such a desired area that may have some communication functionality but not all desired functionality. In some embodiments, such a communication device may include a payment transaction device configured to authorize payments such as on a credit and or debit card.

In some embodiments, a payment transaction device may be configured to provide one way and/or two way communication regarding non-payment related information. Such information may be communicated to a merchant, to a customer, to a delivery agent, to a third party, to a referral service, and so on. Because a merchant may already have a payment transaction device, the additional functionality regarding this information may be added to the merchant without adding an additional type of device that takes up additional space.

Some embodiments may include methods and apparatus related to a referral service and/or a delivery service. Some embodiments of such a service may receive an indication of an order for a merchant from a user of the service and may forward the indication of the order to the merchant. Some embodiments may facilitate delivery of items fulfilling the order from the merchant to the user.

It should be recognized that the term facilitate and derivations thereof are used herein in an extremely broad sense. Such terms may be used to include any action that may directly, and/or indirectly bring about and/or help to bring about a thing. For example facilitating transmission may include allowing a transmission, transmitting, transmitting directly, transmitting indirectly, any action that may aid in transmission, and so on.

In some embodiments, orders for one or more merchants may be collected by an order collector such as a website operated at www.delivery.com. Such a website may provide options for a user to select one or more items from one or more merchants to order and/or have delivered. Such a website may be operated at one or more web servers and or other servers. Such a web site may be reached over the Internet using a web browser, over another network, and so on. Other methods of submitting orders may be used, such as telephone, fax, email, proprietary software, and so on.

In some embodiments, payment for one or more orders may be made through an order collector, to a merchant, to a delivery agent, and so on. Payments may originate from various sources, such as banks, individuals, payment processing services and/or money transferors. Payments may be distributed among merchants, referral service providers, delivery agents, delivery service providers, payment processing services, and any other desired entity.

In some embodiments, an indication of a payment for an order may be received. An indication of a payment may include, for example, one or more of an indication that a payment has been made, an indication that a payment has been authorized, and/or an indication of a promise to make a payment in the future. In some implementations, an indication of a payment may include an indication that a payment has been made to a desired money account. In some implementations, the indication may be received from an entity making or processing a payment to the desired money account (e.g., a bank, a credit card company, a money transferor, a payment processing service). In some implementations, the indication may be received from an entity receiving the money (e.g., a bank, a credit card company, a money transferor, a payment processing service). In some implementations, the indication may be received after the money is authorized to be transferred into the desired account but before the money is transferred/received. In some implementations, the indication may be received after the money is transferred into/received at the desired account.

Some embodiments may include collection of a payment. For example, in some embodiments, a delivery agent may collect a promised payment upon delivery and/or pickup, a credit card may be charged an authorized amount, and so on. In some embodiments, a payment agreed upon initially may be changed later, such as to add a tip, adjust for undelivered items, refund for a coupon, and so on. Some embodiments may further include distributing the collected payment among one or more entities, such as the delivery agent, a merchant, a referral and/or delivery service, a payment processing service, and so on.

FIG. 1 illustrates an example diagram of a service implemented in some embodiments. System 101 may include a computer system as described above. System 101 may be configured to provide a referral and/or delivery service. System 101 may include a web server configured to provide a user interface to one or more users to place orders, to one or more merchants to establish menus and merchant information, to one or more administrators, and so on. System 101 may include any number of servers configured to provide any desired processing regarding order information, payment information, delivery information, review information, and so on. System 101 may include a communication interface configured to communicate information to one or more remote destinations, such as to a merchant, to a payment processing service, to a delivery agent, and so on. Such a communication interface may include a network interface, a SIM card for cellular access, a telephone line, and so on.

Some embodiments may include a merchant 103. In some embodiments, a plurality of merchants may be provided referral and/or delivery service by system 101. Merchant 103 may register with the referral and/or delivery service, such as providing menu information, hours of operation, delivery area information, and so on to the service (e.g., through a website and/or other interface, over the phone, through mail, etc.). Merchant 103 may include a restaurant in some implementations. Such information may include one or more food items offered by a menu of the restaurant.

Some embodiments may include a user 105. User 105 may access a system 101, such as a website to place an order for one or more merchants 103 that use the services offered by system 101. The system 101 may provide information about the items offered by the merchants such as food items offered through a menu of a restaurant. A user may place an order for one or more food items offered by one or more restaurants and/or other items offered by other merchants. Such an order may include a purchase of an item and/or service, a delivery order, a pickup order, and so on. Such an order may include any number of details regarding the order such as allergy information, delivery time, pickup time, directions, delivery agent, and so on. A user may submit payment information for such an order through such a service and/or may later provide payment information to a merchant, to a delivery agent, and so on. Such an interaction may take place through software, through a web browser, on a phone, over fax, via email, and so on.

Some embodiments may include a delivery agent 107. Such a delivery agent may be part of the merchant and/or may be a third party. Such a delivery agent may act to deliver items from the merchant to the user as indicated by a dashed line in FIG. 1. In one implementation, delivery agent 107 may include a person who travels from merchant 103 to user 105. In some implementations, delivery agent 107 may deliver to another location rather than to the user if the user 105 desires such delivery (e.g., if the order indicates such delivery). In some implementations, delivery agent 107 may include a person traveling by an automobile, bicycle, or any other means. Some embodiments may include a communication interface with the delivery agent. Such an interface may allow the delivery agent to communicate with the merchant, the user, the system, the payment processing center, and so on. Such a communication interface may include a telephone line (e.g., a cell phone), a fax machine, a computer and/or another means of electronic communication. For example, in some implementations a cellular telephone may communicate information regarding the delivery to the delivery agent 211, e.g., through a telephone call or text message. In other implementations, an electronic message such as an SMS, MMS, or email message may communicate the information, for example to a mobile device carried by delivery agent 107 or to a central dispatcher that then relays the information to delivery agent 107. Such information may be sent to the delivery agent by another source, such as system 101, merchant 103, user 105, a payment processing service, and so on as desired in an implementation, for example, based on who desired to arrange such a delivery if such a delivery is even desired at all.

Some embodiments may include a payment processing service 109. In some embodiments, payment processing service may be configured to receive information about a credit and/or debit card transaction and facilitate a charge being placed with the credit and/or debit card. The payment processing service may transmit authorization information identifying that the payment has been processed. Payment processing service may include a service such as VeriFone. Such a service being used to provide payment processing to a merchant is well known. For example, a merchant may swipe a credit card into a payment processing device, which may transmit information about the credit card to the payment processing service. The payment processing service may verify the credit card and authorize a charge. In response the payment processing service may send authorization information to the payment processing device which may then print a receipt that a customer signs. It should be recognized that this is one non-limiting example of a use of a payment processing service to process payments. Further examples of a payment processing service, payment processing device, and/or operation not involving processing payments are described elsewhere herein.

Some embodiments may include one or more communication networks 111. Such networks may include one or more combination of networks as desired. For example, such networks may include a telephone line, cable lines, cellular links, wi-fi, DSL lines, face-to-face communication, the Internet and/or one or more local area networks. Each communication link may be separate or may be shared. For example, a network used by a user to access the system may include a local network and/or the Internet. A network used to communicate between a payment processing service and a merchant may include a dedicated link, a telephone line, and/or the Internet. A network used to communicate between a payment processing service and the system may include a dedicated link, a telephone line, and/or the Internet. Various information desired to perform any desired method or transaction may be communicated in any desired format through such networks.

Figure 2:
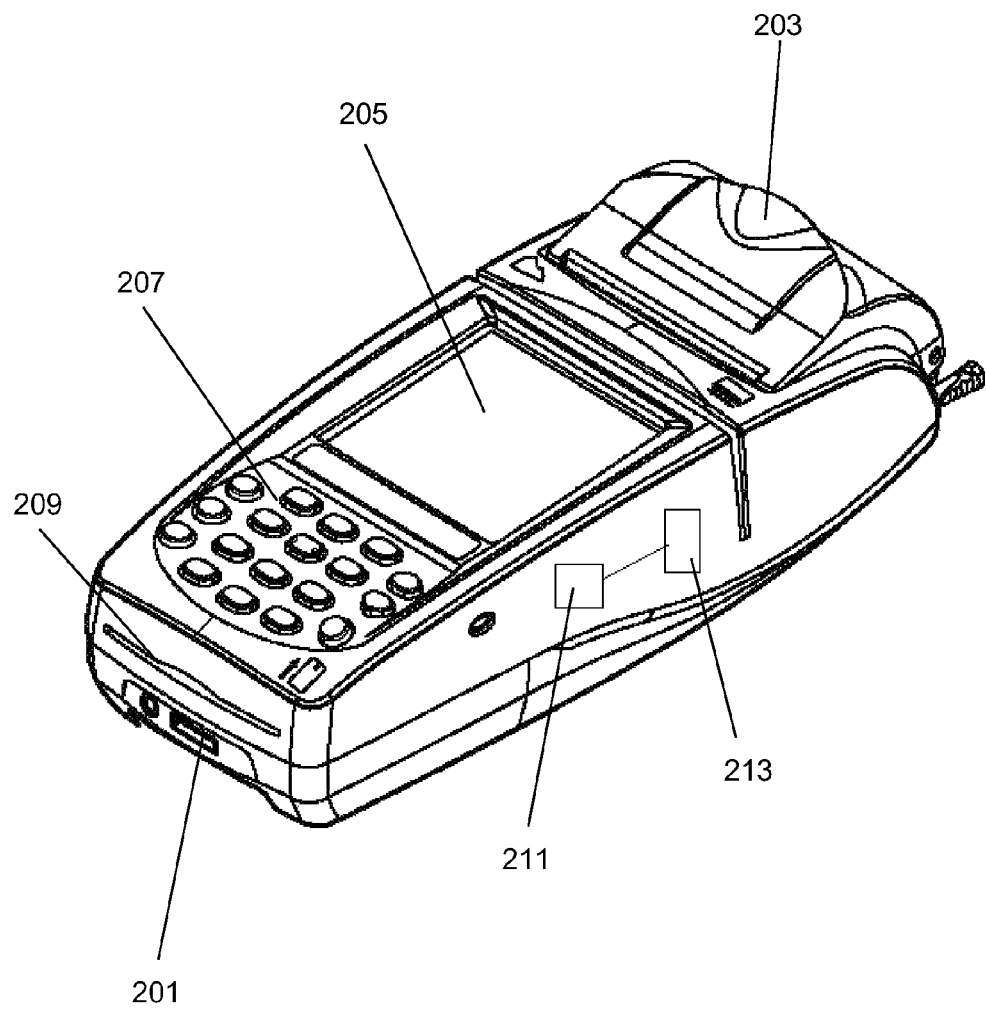
FIG. 2 depicts a payment processing device according to at least one embodiment of the systems disclosed herein.
Figure 3:
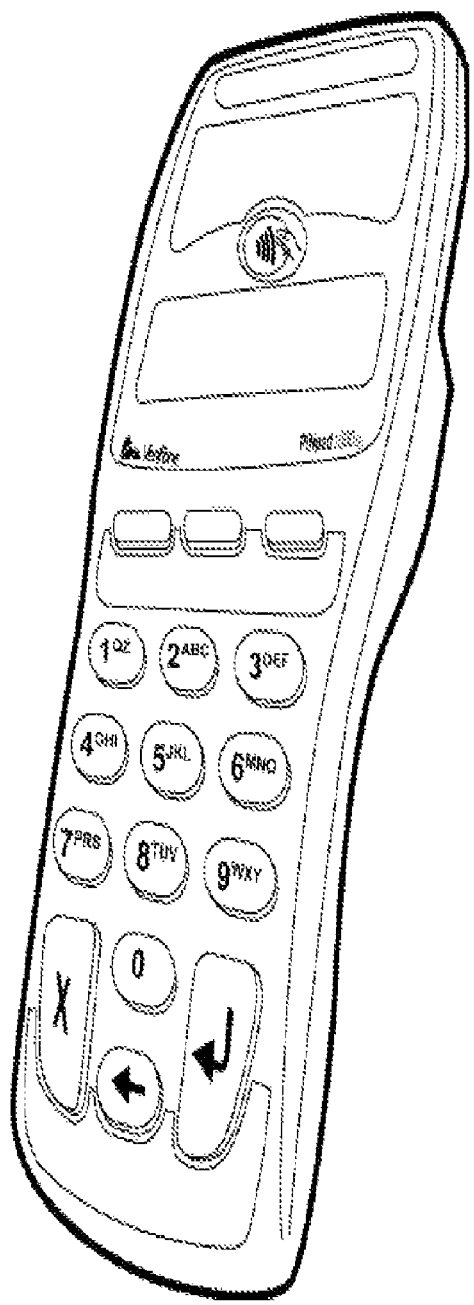
FIG. 3 depicts another payment processing device according to at least one embodiment of the systems disclosed herein.

Some embodiments may include a payment processing device 113 Such a device may be disposed at a merchant (e.g., at a host stand, at a cashier, at a kitchen, etc.). An example of such a device interacting with a payment processing service to process a credit card payment is described above. FIGS. 2 and 3 show non-limiting example payment processing devices that may be used in some embodiments. Such devices may be obtained from VeriFone, Inc. of Canton Mass., Hypercom of Scottsdale Ariz., and Ingenico of Alpharetta Ga. Some non-limiting examples, include the ZON Jr, Tranz models, Omni models, Vx Solutions models, NURIT models, Hypercom T models, and so on.

FIG. 2 illustrates one example payment processing device. Such a device may include a credit card and/or debit card processing device. Such a device may allow a merchant to authorize and/or place a charge on a credit card and/or debit card for a product and/or service. Such a device may communicate with a payment processing service to authorize and/or place such a charge, as described above and known in the art. A payment processing device may include a communication interface, a printer, a keypad, a display, a card reader, a processor, a memory, a peripheral device, and so on.

As indicated at 201, a payment processing device may include a communication interface such as a wi-fi connection, a SIM card, an Ethernet port, a telephone plug, a modem, and so on. Such an interface may provide a continuous connection with a payment processing service. For example, a dedicated data line may connect the device to a communication network such as the Internet. Such an interface may provide an on demand connection with a payment processing service (e.g., demand by the merchant and/or the payment processing service). For example, a telephone call may be made to provide a connection to and/or from the device. In some embodiments, communication using the interface may be encrypted to protect customer privacy.

As indicated at 203, a payment processing device may include a printer. Such a printer may be used, for example, to output a receipt for a customer and/or for a signature. In some embodiments, such a printer may be used to output order information and/or other non-payment information.

As indicated at 205, a payment processing device may include a display. Such a display may be used to display information about a payment. Such a display may be used to display a menu through which a merchant may navigate (e.g., to enter payment details, to enter non-payment details, to view information, and so son). Such a display may be used to output non-payment information. Such a display may output information determined by a processor and/or memory of the device and/or information received from an outside source (e.g., payment processing service).

As indicated at 207, a payment processing device may include a keypad. Such a keypad may be used to navigate a menu. Such a keypad may be used to input information into the device (e.g., payment information, non-payment information, confirmation information, menu navigation commands, and so on). Such a keypad may be used to enter PINs, security codes, and so on.

As indicated at 209, a payment processing device may include a card reader. Such a card reader may be used to read a magnetic strip from a credit and/or debit card. Some embodiments may include an RFID or other wireless card reader that may wirelessly read card information from a credit and/or debit card. Such card readers are known in the art. In some embodiments, a keypad may be used to enter card information.

A payment processing device may include any desired computing device components. For example, a payment processing device may include a processor 211 and/or memory 213 that may execute and/or store a program and/or data. For example such a program may perform a method regarding payment transaction that allows a merchant to use the device to authorize and/or charge a payment to a credit card and/or debit card. Such a program may perform a method regarding non-payment transactions such as a method described elsewhere herein.

Some embodiments may include connections to peripheral devices, such as external printers, external display screens, cash registers, and so on. Such devices may take the place of and/or work with included devices. For example, in some embodiments, a cash register may input payment totals to the payment processing device, a printer may be used to printer reports or information on larger paper, and so on.

FIG. 3 illustrates another example payment processing device. In this example, such a payment processing device includes a wireless handheld model that may be used in some embodiments. Such a device may, in some embodiments, communicate with a base station. Such a device may perform similar functionality of the example shown in FIG. 2.

It should be recognized that FIGS. 2 and 3 are given as examples only and that other embodiments may include any form of payment processing device. Such a device may include any form of input and/or output such as hearing and/or vision impaired methods of input and/or output and so on. Some embodiments may include audio input and/or output, haptic input and/or output, and so on.

In some embodiments, operation of a payment processing device to perform a payment may include receiving information about a sale, such as from a keypad entry, from an external device such as a cash register. Then, information about a payment method may be received. Such information may be received by entry of information using a keypad and/or display, swipe and/or tap of a card and so on. Payment method information may be transmitted to a payment processing service, and an authorization may be received from the payment processing service indicating that the payment has been authorized and/or charged to a credit and/or debit card. An output of such authorization may be provided through the device or a peripheral, such as a display and/or a receipt.

Figure 4:
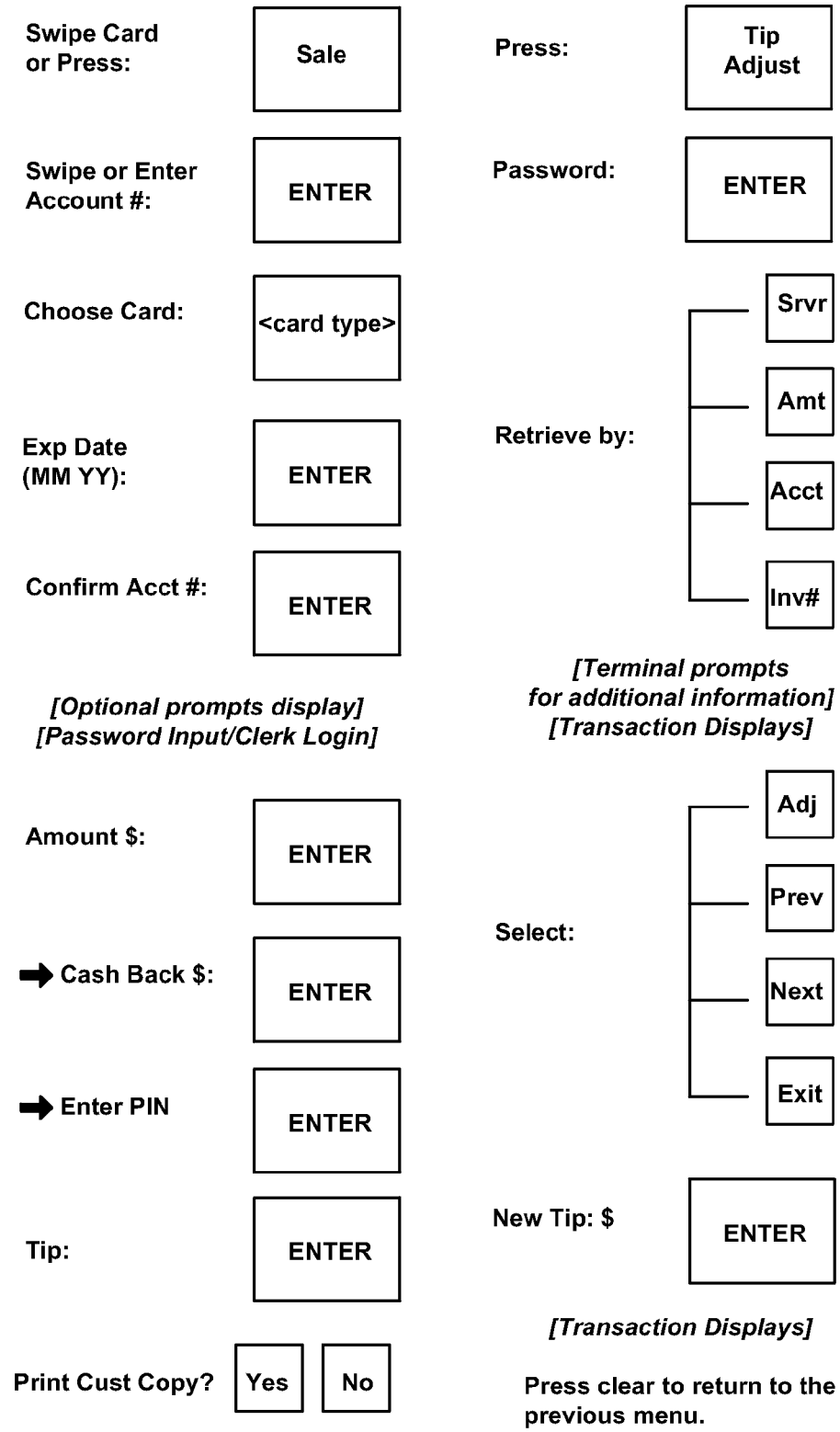
FIG. 4 depicts a some menus interactions according to at least one embodiment of the systems disclosed herein.

Various actions may be performed through using a payment processing device by accessing one or more menus. Some example menu prompts and interactions are shown in FIG. 4 that may allow a merchant to enter payment information, tip information, print receipts, and so on. Operation through such a menu may result in one and/or two way communication with a payment processing service and/or output through a display, printer and/or other device. Additional menus may be used to extend functionality to non-payment options as explained elsewhere herein.

In some embodiments, a payment processing device and/or payment processing service may be configured to provide non-payment related services such as service related to the system 101 of FIG. 1. For example, such a device and/or service may allow communication regarding orders, delivery, confirmation, and so on that may be received by system 101. Such communication may be one way and/or two way. Such communication may be originated by system 101 through a payment processing service.

In operation, a system such as that shown in FIG. 1 and/or any other entity may perform one or more processes to provide non-payment functionality using a payment processing device of a merchant. In some embodiments, to enable such functionality, as described elsewhere herein, one or more programs may be configured to accept input, respond to input, receive and/or transmit data, and/or perform any desired function. Such a program may, for example, include a program on a memory, such as a memory of a server, of a computer system of a payment processing service, of a payment processing device, of a user's computing device, and/or any other device.

As discussed elsewhere herein, some embodiments may include different formatting of information and payments for various entities. In some embodiments, a singe system 101 may interact with multiple payment processing systems that may use different formatting and/or payment schemes. An arrangement may be made between such entities to provide for proper formatting, work arrangements, payment, and so on.

Figure 5:
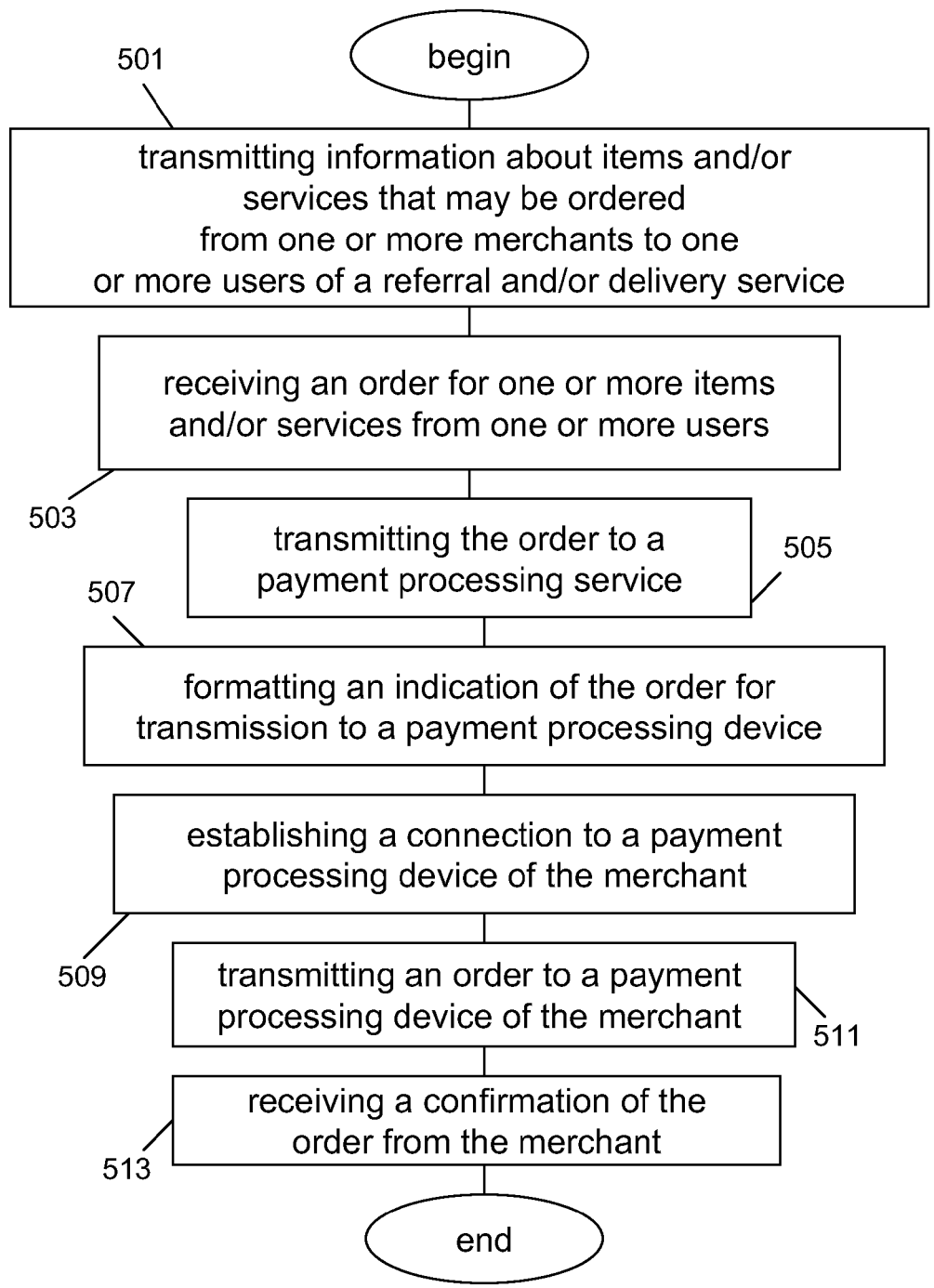
FIG. 5 depicts an example method according to at least one embodiment of the systems disclosed herein.

FIG. 5 illustrates one non-limiting example method that may be used in some embodiments. Such a process may be performed, for example by system 101, payment processing service 103, a user, and/or a payment processing device of a merchant in any combination desired. Such a process may be performed by one or more servers and/or processors. In some embodiments, such a process may be performed at least in part by a system such as system 101.

Some embodiments may include receiving and/or transmitting information about one or more items and/or services that may be ordered from one or more merchants. Such information may be received from a merchant and/or another source. Such information may be received by a provider of a referral and/or delivery service.

As indicated at block 501, some embodiments may include transmitting information about items and/or services that may be ordered from one or more merchants to one or more users of a referral and/or delivery service. Such transmitting may be performed, in some embodiments by system 101. Such information may be transmitted via the Internet to be displayed as a webpage in a web browser operated by a compute ring device of the user. Such information may include be a menu of food items offered by one or more restaurants. In some embodiments, a user interface may include for example, a website, mobile device interface and so on. The user interface may allow the user to select a particular merchant or merchants and products and/or services from the particular merchant or merchants. In such implementations, for example, the user interface may display a representation of available merchants (e.g., a list of merchants that may be in an identified geographical location associated with the user and/or merchants that are open at the time) to which the user may submit orders. In some embodiments, a listing or other representation of items and/or services may be displayed in a user interface for the user to select from.

In some embodiments, the user may select one or more items and/or services and in response, an indication of an order be transmitted from the user. In some implementations, the selected products and/or service may be stored in a "shopping cart" of a website and the order may be submitted for processing after the user has finished selecting products and/or services, for example, after the user has proceeded to a checkout interface through which the user may authorize payment for the products and/or services, as is known in the art.

As indicated at block 503, some embodiments may include receiving an order for one or more items and/or services from one or more users. Such receiving may be performed, in some embodiments by service 101. The order may include any information desired to identify desired items and/or product, any desired merchant, and/or any desired characteristics about an order (e.g., time, allergies, delivery location, special request, etc.). In some implementations, the received indication of the order may include one or more electronic messages. In some embodiments, an indication of an order may include an order for products and/or services from multiple merchants.

In some embodiments, in which such an order includes items and/or services from multiple merchants, a different method of forwarding onto each merchant may be used. The following description describes an example in which an order is for a single merchant, but it should be recognized that similar methods may be used in other embodiments.

In some embodiments, payment information may be received with and/or separate from order information. Such payment information may be used to make a payment for an order. In other embodiments, payments may be arranged with a merchant and/or a delivery agent.

As indicated at block 505, some embodiments may include transmitting the order to a payment processing service. Such transmitting may be performed by system 101. Such transmitting may be performed in response to the receiving of block 503. In some embodiments, a determination may be made as to which of a number of payment processing services a merchant uses and transmission may be made o that payment processing service. This may be performed based on a lookup table that includes information about the merchant (e.g., information obtained at the time of sign up). Such transmission may include transmitted over a communication network in any desired format.

As indicated at block 507, some embodiments may include formatting an indication of the order for transmission to a payment processing device. Such formatting may be done at a system 101 and/or at a payment processing service 109 before and/or after block 505. Such formatting may be performed in response to the receiving of block 503, a receiving of the transmission of block 505, and so on. Such formatting may include placing order information into a form that may be understood by the payment processing device. This may include, for example, a proprietary format, an XML format, any desired packet format, and so on. Such a format may be a same or different format than the format in which the order is received form a user.

As indicated at block 509, some embodiments may include establishing a connection to a payment processing device of the merchant. Such establishing may be done at a system 101 and/or at a payment processing service 109 before and/or after any other actions. Such establishing may be done in response to receiving a transmission of block 505, in response to a receiving of block 503, and so on. A connection to the payment processing device may be established by a payment processing service in a similar manner for payment processing activities. Establishing such a connection may include establishing a dedicated connection with the payment processing device that may have been established prior to the user placing an order, for example. Establishing such a connection may include establishing a transaction specific connection that may be established in response to the user placing the order. Establishing a connection may include, for example, transmitting connection information to an IP address, making a telephone call to a line connected to the payment processing device, and so on.

As indicated at block 511, some embodiments may include transmitting an order to a payment processing device of the merchant. Such transmitting may occur at a system 101 and/or at a payment processing service 109. Such transmitting may take place using the established connection from block 509 and using a format from block 507. Such transmitting may be performed in response to a receiving of block 503, a receiving of a transmission of block 505, an establishing of block 509, and so on. In some embodiments, the transmitted order information may include details about an order. The detail may include abbreviations that may be established by the merchant. The details may include prices, times, quantity, item names, a pickup time, a delivery time, a delivery address, a delivery agent, and so on. In some embodiments, transmitting may include transmitting confirmation information. Such confirmation information may include a confirmation code, a confirmation image, a confirmation telephone number and so on. Such information may be used so that a merchant may confirm receipt and acceptance of an order. Such confirmation information may include, for example, a CRC number or other error detecting codes.

In some embodiments, transmitting and/or formatting may include arranging so that output is properly output. For example, a system may determine an end of a description of one item in an order so that the description is less than a maximum number of characters for an output method (e.g., one receipt page, one page of a display). In some embodiments, this may be performed by a payment processing device such as sing a memory or program and/or a menu system.

As indicated at block 513, some embodiments may include receiving a confirmation of the order from the merchant. Such receiving may occur at a system 101 and/or at a payment processing service 109. In some embodiments, such confirmation may be received from a payment processing device of the merchant. For example, a merchant may enter a confirmation code from the order transmission into the device and that code may be transmitted from the device (e.g., using the established connection and/or another connection) and received. As another example, a merchant may enter a confirm button associated with an order and/or one or more items in the order to confirm the order and/or the items. Such confirmation may be transmitted from the device (e.g., using the established connection and/or another connection) and received.

In some embodiments, in which confirmation is received by a payment processing service that is separate from a referral and/or delivery service system, such a confirmation may be to the referral and/or delivery service system and received thereby. In some embodiments, in which such a confirmation is received by a system 101 and/or in which system 101 and a payment processing service are a same entity, such forwarding may not be performed.

In some embodiments, confirmation may take any number of forms that may or may not involve a payment processing device. For example, in some embodiments, a confirmation may include calling a number and/or receiving a call and inputting a code or other information about the order (e.g., to an automated system), sending an email, entering information on a website, faxing, and so on.

Some embodiments may include retrying to send information about an order if confirmation is not received within a desired time period. Such a time period may include any amount of time such as 1 minute 5 minutes 10 minutes 20 minutes, and so on. Such retrying may be performed by a payment processing service and/or a system 101. Retrying may be performed any number of times desired. Retrying may include other methods of sending order information other merchant. After some threshold number of failed retries the user may be notified that the order cannot be completed and may be given an opportunity to place a new order with a different merchant. For example, a system may determine other merchants that may service the user with similar items and/or service and may provide an indication of those opportunities to the user (e.g., through a user interface, through a phone call, through an email, and so on). such information may be presented to a customer service representative that may then call the user with the information. Any other method of facilitating re confirmation and/or order change may be performed in an embodiment.

Some embodiments may include facilitating delivery. Such facilitation may be performed by a merchant and or system 101. Such facilitation may be performed in response to a receipt of a confirmation. Such facilitation may include sending information to one or more delivery agents. In some embodiments, information about a delivery may be transmitted along with order information to a merchant. Such information may include a time of delivery and/or pick up for an order, an authorized delivery agent, contact information for the delivery agent, and so on. Such information may be sent along with order information, at a different time from order information, and so on. For example, such information may be sent after a delivery agent confirms that they will be able to make the delivery which may be after the order information is sent to the merchant.

In some embodiments, a payment may be exchanged among merchant, user, delivery agent, referral and/or delivery service, payment processing service, and/or any other desired entity. In some implementations, for example, the user may provide a payment to delivery agent. Delivery agent may provide the payment to the merchant who may later provide the payment to any other desired entity. The delivery agent may take a or receive a payment at that time or a later time.

It should be recognized that while FIG. 5 illustrate one non-limiting example method, other embodiments may include any method desired which may include same or different actions in any desired order and/or number. It should be recognized that while the above description is given in terms of order information, that similar methods may be used to provide any desired non-payment information, such as reservation information, shipping of goods (e.g., wines, ingredients, and so on) information, and/or any other desired non-payment information. It should be recognized that while non-payment information may be communicated in some embodiments, payment information may be communicated in addition to such non-payment information to and/or form the merchant at any desired step in any method (e.g., a payment method and/or authorization may be transmitted to the merchant along with the order and/or in response to a confirmation by the merchant). It should be recognized that action of such a process may be performed by any entity as desired in various embodiments.

Figure 6:
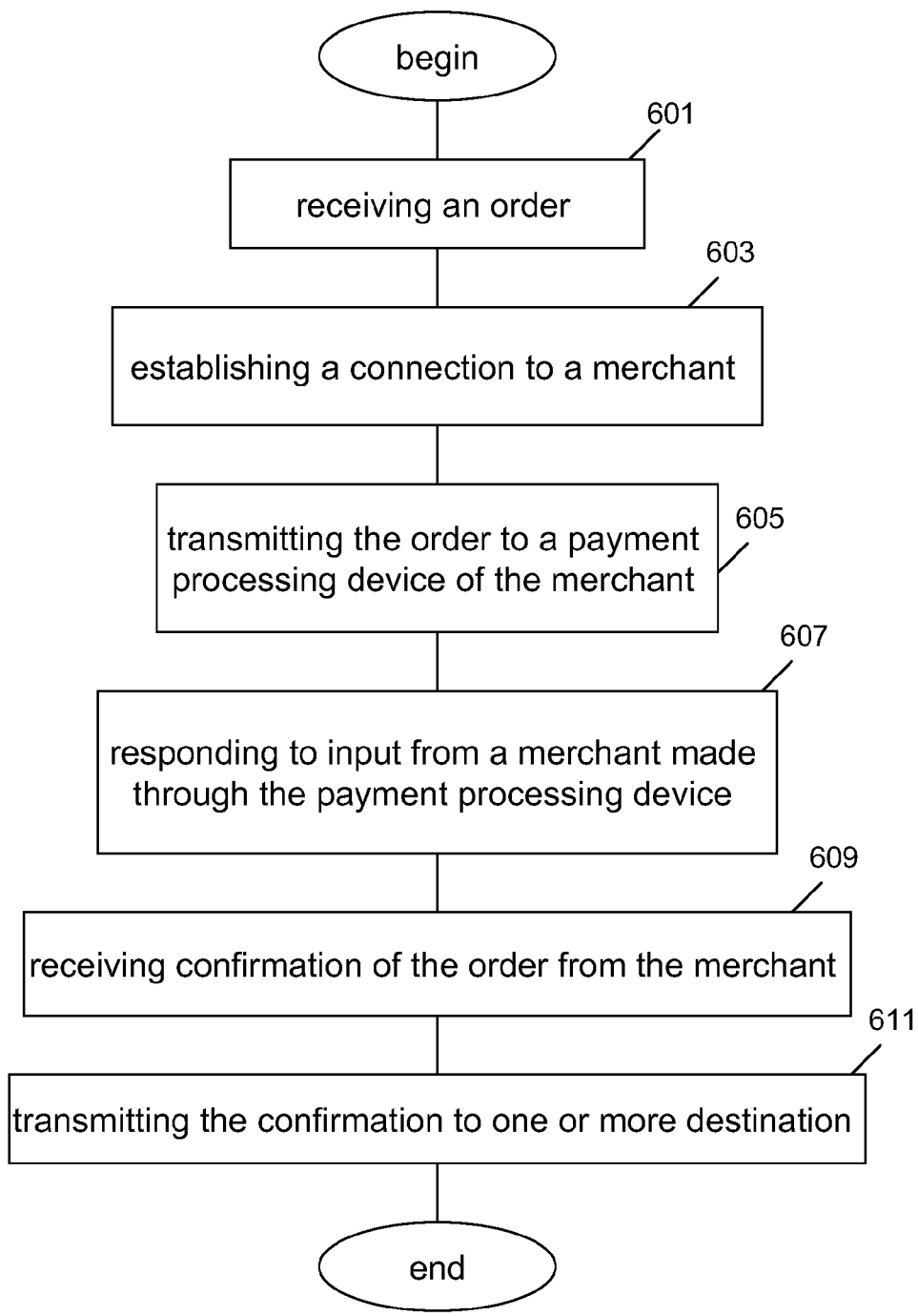
FIG. 6 depicts another example method according to at least one embodiment of the systems disclosed herein.

Some embodiments may include one or more processes that may be performed by a system 101, a payment processing service 109, a user, and/or a merchant in any combination. FIG. 6 illustrates a non-limiting example of such a process. Such a process may be performed by one or more servers and/or processors. In some embodiments, such a process may be performed at least in part by a payment processing service.

As indicated at block 601, some embodiments may include receiving an order. Such an order may be received in any format. Some embodiments may include formatting the received information to another format such as that used by a payment processing device. In some embodiments, the order may be received in such a format. The order may be received from system 101 by a payment processing service. The order may be received by system 101 from a user. A recipient of the order may determine how to communicate the order to a merchant.

As indicated at block 603, some embodiments may include establishing a connection to a merchant. Such establishing may be performed in response to receiving of block 601. Such establishing may be performed by system 101 and/or a payment processing service. Such establishing is described elsewhere herein.

As indicated at block 605, some embodiments may include transmitting the order to a payment processing device of the merchant. Such transmitting may be performed in response to the establishing of block 603, in response to the receiving of block 601, and so on. Such transmitting may be done by system 101 and/or a payment processing service such as over the established connection in the desired format. Such transmitting is described elsewhere herein.

As indicated at block 607, some embodiments may include responding to input from a merchant made through the payment processing device. For example, input from the merchant may be received, and output to the merchant may be made in response to the input. Input may include, for example, a button being pressed, such as a more information and/or page up or down button. In some embodiments, such responses may be performed by the payment processing device. For example, an entire order may be sent to the payment processing device and a portion may be shown per screen. When a next page button is pressed, the payment processing device may access a memory to display the next portion of the order. In some embodiments, such responses may be performed by system 101 and/or a payment processing service. For example, only portions of an order may be transmitted at a time that correspond to what is shown to a merchant on a display and when a merchant presses a next page button more information may be transmitted.

As indicated at block 609, some embodiments may include receiving confirmation of the order from the merchant. In some embodiments, such receiving may be performed by system 101 and/or a payment processing service. Such receiving is described elsewhere herein.

Some embodiments may include retrying transmission if a confirmation is not received. Such retrying may be on an order by order basis and/or an item by item basis. Retrying is described elsewhere herein.

As indicated at block 611, some embodiments may include transmitting the confirmation to one or more destination. Such transmitting may be performed din response to the receiving of block 609. Such transmitting may be performed by system 101 and/or a payment processing service. For example, such transmitting may include transmitting to system 101 from a payment processing system, transmitting to a user from system 101, and so on. Such transmitting is described elsewhere herein.

It should be recognized that while FIG. 6 illustrate one non-limiting example method, other embodiments may include any method desired which may include same or different actions in any desired order and/or number. It should be recognized that while the above description is given in terms of order information, that similar methods may be used to provide any desired non-payment information, such as reservation information, shipping of goods (e.g., wines, ingredients, and so on) information, and/or any other desired non-payment information. It should be recognized that while non-payment information may be communicated in some embodiments, payment information may be communicated in addition to such non-payment information to and/or form the merchant at any desired step in any method (e.g., a payment method and/or authorization may be transmitted to the merchant along with the order and/or in response to a confirmation by the merchant). Some embodiments of FIG. 6 may be performed by a payment processing service. Some embodiments may be performed by any desired entity. It should be recognized that action of such a process may be performed by any entity as desired in various embodiments.

Figure 7:
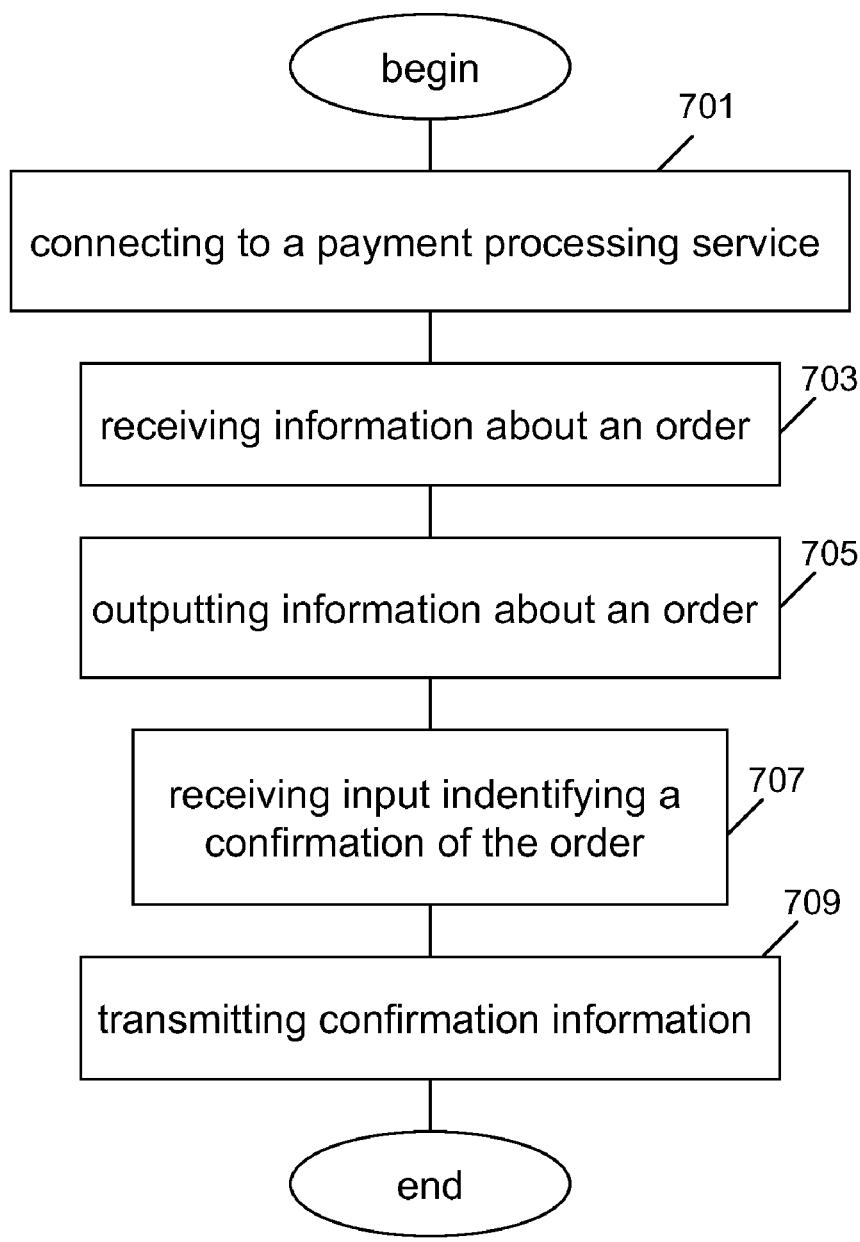
FIG. 7 depicts yet another example method according to at least one embodiment of the systems disclosed herein.

Some embodiments may include one or more processes that may be performed by a system 101, a payment processing service 109, a user, a merchant, and/or a payment processing device in any combination. FIG. 7 illustrates a non-limiting example of such a process. Such a process may be performed by one or more servers and/or processors. In some embodiments, such a process may be performed at least in part by a payment processing device.

As indicated at block 701, some embodiments may include connecting to a payment processing service. Such connecting may be performed by a payment processing device of a merchant. Such connecting may include accepting a connection request such as picking up a phone call, using a modem to demodulate information, accepting an incoming packet over a data cable, and so on. Such connecting may include making a connection request such as dialing a phone number, using a modem to modulate information, transmitting an outgoing packet over a data cable, and so on. In some embodiments, as discussed elsewhere, such a connection may include an on demand connection, a constant connection and so on. In some embodiments, a periodic, continuous, occasional, constant and so on connection and/or periodic polling of a payment processing service for non-payment information may be initiated by a payment processing device. In some embodiments, a payment processing service may push such information to a payment processing device when it is available in addition to and/or as al alternative to such polling.

As indicated at block 703, some embodiments may include receiving information about an order. Such information may be received by a payment processing device of a merchant. Such information may be received from a payment processing service, a system 101, a user, and/or any other entity. Such information may be received in a format readable by a payment processing device. Such information may be received using an established connection from block 701. Such information may indicate one or more ordered items, one or more confirmation items, one or more delivery and/or pickup items, one or more special instructions, and/or any other desired information. Such information may be received in multiple portions at a same or different time (e.g., items ordered first then later delivery confirmation, first page first, then second page after a next page button is pressed, all information at one time, etc.). Various examples of such information and transmitting such information that may apply in some embodiments are given elsewhere herein.

As indicated at block 705, some embodiments may include outputting information about an order. Such outputting may be performed by a payment processing device and/or accessory. Such outputting may be performed in response to the receiving of block 703. Such outputting may include displaying onscreen, printing, and so on. In some embodiments, outputting may include outputting such that a item break does not occur at a screen break or a paper break, for example. Outputting may include outputting confirmation information that may be part of and/or received with the order information. Various examples and discussions of outputting are described elsewhere herein that may apply.

As indicated at block 707, some embodiments may include receiving input indentifying a confirmation of the order. Such receiving may be performed by a payment processing device. Such receiving may include receiving input from a merchant, such as button presses, touch screen presses, and so on. Such confirmation may be on a per order basis and/or a per item basis. Such confirmation may include a confirmation for a delivery method and/or time. Such confirmation may include a change to one or more elements of the information, such as an adjustment to the delivery time. Such confirmation may include entry of a code, navigation of a menu, pressing of a confirmation button, and so on. Various examples of confirmation that may apply are desired elsewhere herein.

As indicated at block 709, some embodiments may include transmitting confirmation information. Such transmitting may be performed by a payment processing device of a merchant. Such transmitting may be in response to the input received by the payment processing device. Such transmitting may be using the established connection of block 701. Such transmitting may include transmitting in a desired format and/or formatting to that format. Such transmitting may include transmitting to a payment processing service, a system 101, a user, and so on. Various examples of transmitting that may apply are desired elsewhere herein.

In some embodiments, if a confirmation includes change to an order item, such as a change to a time and/or price is entered, such information may be communicated to a payment processing service and/or any other entity and reported to the user, the delivery agent, a credit card, and so on. Such a recipient may properly any timing and/or expectations as desired.

Various other examples of confirmation that may be used in some embodiments and that may not involve transmitting, such as using an automated telephone system, are described elsewhere herein.

Some embodiments may include transmitting additional information, such as cancellation of and order, non-confirmation information, order change information, and so on. Such information may be transmitting in response to input form a merchant, in response to receiving information from a payment processing service, unilaterally by the merchant, and so on.

Some embodiments may include making food and/or other items, delivering such items to a user, processing payment, performing a service for a user, and so on.

It should be recognized that while FIG. 7 illustrate one non-limiting example method, other embodiments may include any method desired which may include same or different actions in any desired order and/or number. It should be recognized that while the above description is given in terms of order information, that similar methods may be used to provide any desired non-payment information, such as reservation information, shipping of goods (e.g., wines, ingredients, and so on) information, and/or any other desired non-payment information. It should be recognized that while non-payment information may be communicated in some embodiments, payment information may be communicated in addition to such non-payment information to and/or form the merchant at any desired step in any method (e.g., a payment method and/or authorization may be transmitted to the merchant along with the order and/or in response to a confirmation by the merchant). Some embodiments of FIG. 7 may be performed by a payment processing device. Some embodiments may be performed by any desired entity. It should be recognized that action of such a process may be performed by any entity as desired in various embodiments.

Figure 8:
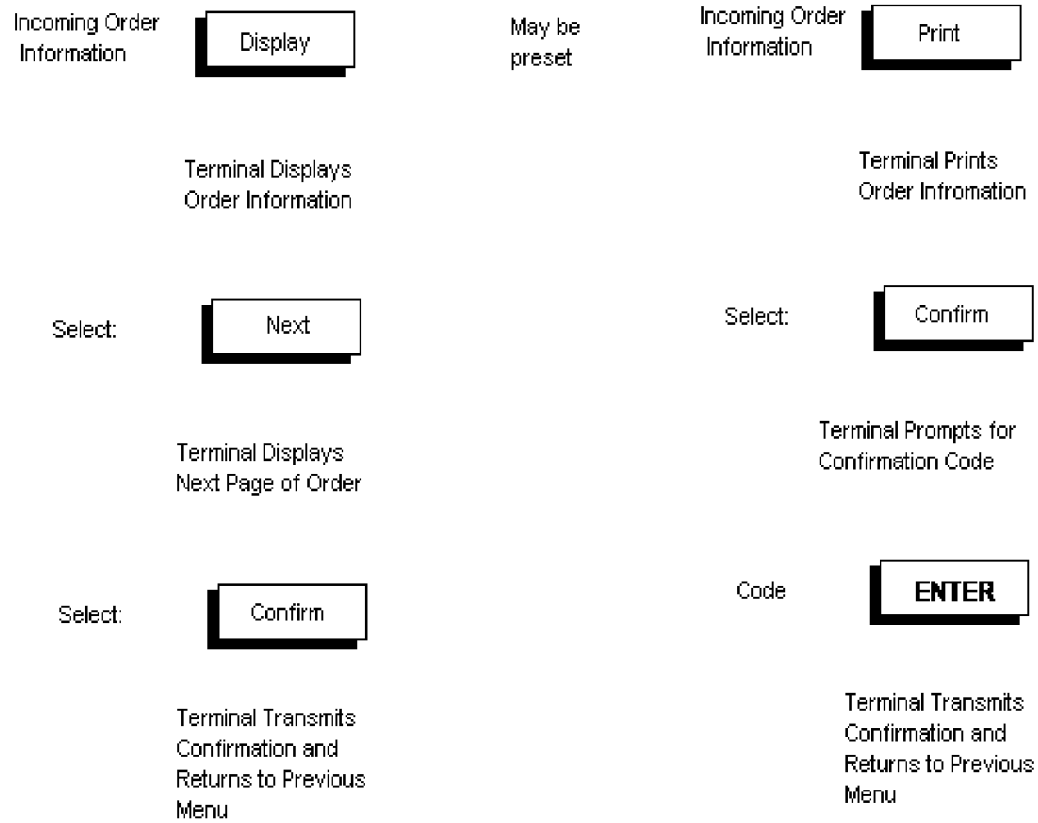
FIG. 8 depicts some more menu interactions according to at least one embodiment of the systems disclosed herein.

In some embodiments, to facilitate entry of information using a payment processing device, some embodiments may include ea menu. Such a menu may change in response to key presses, touch screen touches, and/or any other input. Display menus for entry of the information in response to key presses. Some example menu prompts and interactions that may be used in some embodiments are shown in FIG. 8.

It should be recognized that while some embodiments are described in terms of a restaurant, some embodiments may include a retail store, a service provider, and/or any other desired merchant and/or entity.

In some embodiments, various entities may be paid for performance of one or more actions. For example, a delivery agent may be paid for delivering an item, a payment processing service may be paid for processing a payment, a payment processing service may be paid for transmitting non-payment communication, a referral service may be paid for providing a referral. In some embodiments, such payment may come from a merchant, and/or money received by a merchant.

Some embodiments may include various methods and/or systems that may facilitate order submission. For example, such orders may be submitted through a user interface such as a website as described elsewhere herein. As another example, such orders may be submitted using an easy order interface. Such an easy order interface may allow a user to submit a favorite order, for example, with a single actuation (e.g., a single or double click on an icon on a desktop). Such an easy order interface may include a hyperlink, a computer program, a software widget, and so on.

It is recognized that a user may have a favorite and/or commonly made order. It is recognized that accessing a website in a traditional method may take more time than is needed to place such an order in some embodiments. In some embodiments, an easy order interface may be used to improve the speed and/or efficiency of order placement for example, for such favorite and/or commonly made orders compared to traditional website order entry.

Figure 9:
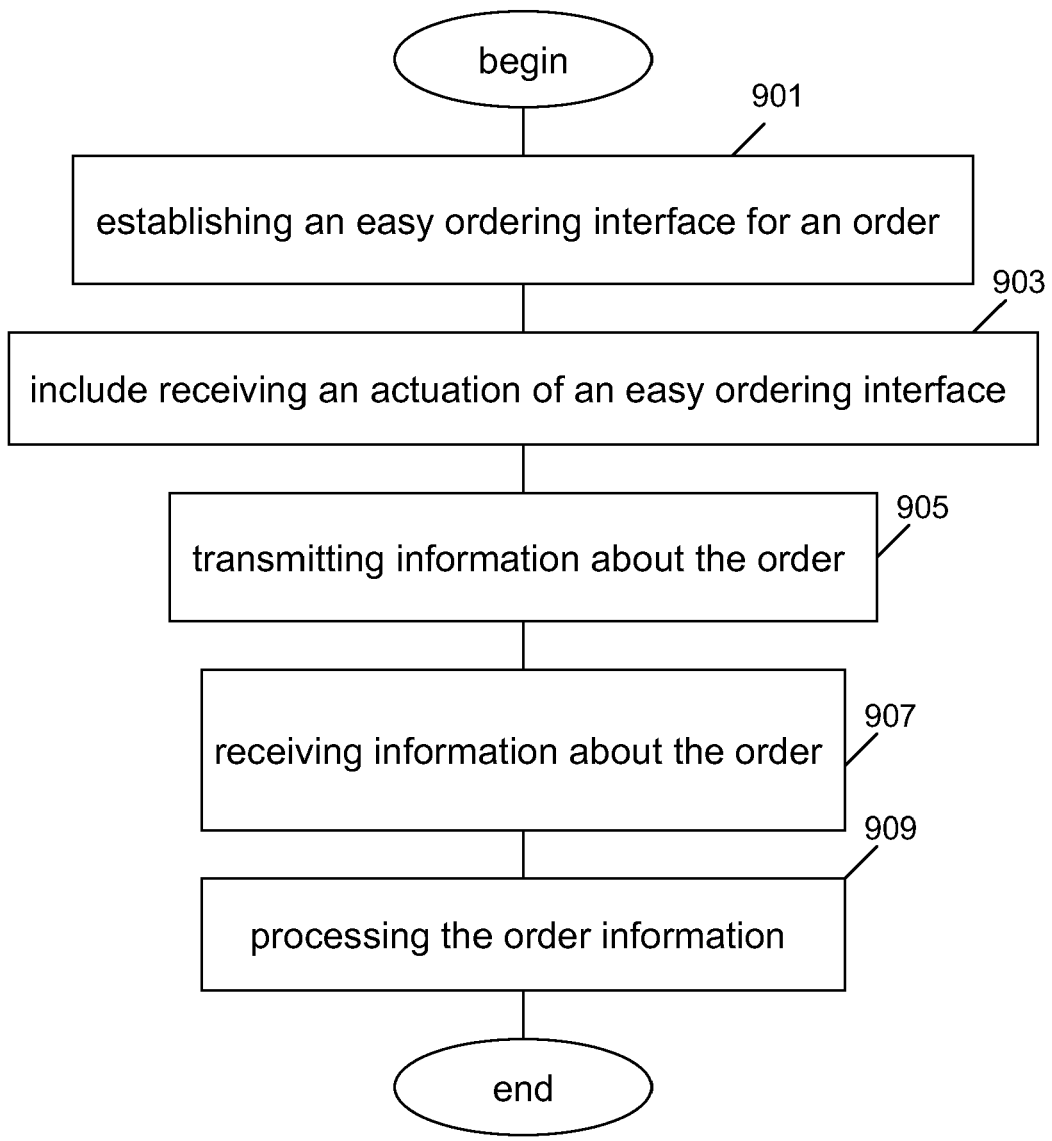
FIG. 9 depicts yet another example method according to at least one embodiment of the systems disclosed herein.

FIG. 9 illustrates one non-limiting example method that may be used in some embodiments. Such a process may be performed, for example by system 101, a user, and/or any entity or combination of entities. Such a process may be performed by one or more servers and/or processors. Such a process may be used to implement an easy ordering interface in some embodiments.

As indicated at block 901, some embodiments may include establishing an easy ordering interface for an order. In some embodiments, an easy order interface may enable a user to place an order in a non-traditional manner. In some embodiments, an easy order interface may enable a user to place an order through a single actuation (e.g., a single click on an icon, a single click on a link, a double click on an icon, a double click on a link, a press of a button, and so on). In some embodiments, establishing an easy ordering interface may include establishing one or more orders to be placed using the easy ordering interface, establishing a payment method for the one or more orders, establishing an interface for the easy ordering interface, and/or establishing any desired information to place an order may be performed such as establishing a user account and/or information. Such actions may be performed, for example, by a user, by a system 101 and/or by any other desired entity. Such an interface may include an icon (e.g., on a desktop, start menu, etc.). Establishing may include placing an icon on a computing device.

In some embodiments, establishing one or more orders to be placed using the easy ordering interface may include receiving a selection of item(s) and/or merchant(s) from a user. Such items and/or merchant may be selected and/or otherwise entered by a user through a user interface, for example. Such a selection may be received by a program and/or processor of a user device. Such a selection may be received by a system 101. Such a selection may indicate one or more items to be ordered using the easy order interface from one or more merchants. Establishing one or more orders may include storing information about the orders. Such information may be stored locally on a user's device, remotely on a system 101, remotely at a merchant, and/or by any desired entity. For example, in some embodiments, such an order may be stored by a computer program operating on a user's computer device, may be embedded in a hyperlink (e.g., as a code, in plaintext, etc.), may be stored at system 101, and so on.

In some embodiments, establishing a payment method may include receiving information about a payment from the user. Such information may be selected and/or otherwise entered by the user through a user interface. Such information may include, for example, a credit card number, a debit card number, a corporate account number, a selection of cash payment, and so on. Such information may be received by a program and/or processor of a user device. Such information may be received by a system 101. Such information may be used as a payment method for orders placed using the easy order interface. Establishing the payment method may include storing payment information. Such information may be stored locally on a user's device, remotely on a system 101, remotely at a merchant, and/or by any desired entity. For example, in some embodiments, such information may be stored by a computer program operating on a user's computer device, may be embedded in a hyperlink (e.g., as a code, in plaintext, etc.), may be stored at system 101, and so on In some embodiments, establishing an interface for the easy ordering interface may include storing information on a computing device. Such information may include, for example, computer code, order information, payment information, merchant information, item information, a hyperlink, xml code, user information, a software program, and/or another desired information, Such information may be stored on system 101, by a merchant, on a user computing device, and/or by any otter desired entity. For example, in some embodiments, an icon on a desktop, a start menu, a quick launch menu, and so on by be created that activates a program and/or hyperlink. The hyperlink or program associated therewith may store the information in a plain text and/or code version. For example, clicking on the icon may cause the information to be transmitted from a user to a system 101. In some embodiments clicking on such an icon may cause an indication of the order to be sent to system 101. System 101 may interpret the indication to retrieve the actual order. For example, a code identifying the order may be sent and the system may interpret the code by looking up the stored information at the system 101.

As indicated at block 903, some embodiments may include receiving an actuation of an easy ordering interface. Such actions may be performed, for example, by a user, by a system 101 and/or by any other desired entity. Such an actuation may include, for example, clicking on a link, double clicking an icon, pressing a button, and so on. An actuation may be performed by a user when the user desires to place the order. A user, for example, may double click on an icon on a desktop corresponding to the easy ordering interface. The user computer may receive an indication that the user made such an actuation.

As indicated at block 905, some embodiments may include transmitting information about the order. Such actions may be performed, for example, by a user, by a system 101 and/or by any other desired entity. Such an action may be performed in response to receiving the actuation. Such transmitting may include transmitting to system 101 from a user computing device. The information transmitted may include actual items for an order, a code identifying an order, and so on. In some embodiments, payment information may be transmitted, information identifying a user may be transmitted, any information desired to complete an order may be transmitted, and so on. In some embodiments, such a transmitting may be performed in response only to receiving an actuation. For example, no further input may be needed and/or requested to may such a transmission. Such a transmission may be made without requesting and/or receiving any and/or additional input from a user (e.g., no request for payment information, no request for password, and so on).

As indicated at block 907, some embodiments may include receiving information about the order. Such actions may be performed, for example, by a user, by a system 101 and/or by any other desired entity. Such an action may be performed in response to the transmitting of the information.

As indicated at block 909, some embodiments may include processing the order information. Such actions may be performed, for example, by a user, by a system 101 and/or by any other desired entity. Such an action may be performed in response to the receiving of the information. Such processing may include determining items, a user, a payment and so on for the order, such as by using a look up table keyed with the information (e.g., a code). Such processing may include authorizing a charge, such a through a payment processing service. Such processing may include arranging fulfillment of the order, such as by transmitting information to a merchant and/or delivery agent as described elsewhere herein.

In some embodiments, processing an order may include facilitating delivery. Such delivery may include delivery of items of an order from a merchant. Such delivery may be facilitated in response to receiving an indication of the actuation, in response to receiving information about an order, and so on. In some embodiments, such facilitation may be performed without requesting input from a user.

In some embodiments, processing an order may include completion of a payment. Such a payment may be for items from a merchant. Such a completion may be performed in response to receiving an indication of the actuation, in response to receiving information about an order, and so on. In some embodiments, such completion may be performed without requesting input from a user. Such a payment may include a charge on a credit card.

In some embodiments, delivery may include delivery of a pre-established set of items from a merchant to a user. In some embodiments, completion of a payment may include completion of a pre-established payment for the items. Such pre-establishing may include establishing with the user interface, prior to receiving an indication of an actuation, prior to an actuation, and so on (e.g., by storing information at a system 101, at a user device, and so on).

In some embodiments, such a method may allow a user to have an order fulfilled with no further action on the user's part, such as no entry of information in an interface. Accordingly, a single actuation may allow a user to place an order. Some embodiments may include asking a user for confirmation to avoid accidental order placement. Some embodiments may include notifying a user if the order cannot be fulfilled such as because a merchant is closed.

Although an example is given with a single order and/or merchant, it should be recognized that any number of orders and or merchants may be included in other embodiments. For example, an order may include a weekly shopping list from a plurality of merchants that the user would like placed each week. An order may include a series of orders that are run through in order before resetting (e.g., first click is order 1, second click is order 2, then repeat). In some embodiments, separate easy ordering interfaces may be established for different orders.

It should be recognized that although some examples are given in terms of a single transaction, some embodiments may include any number of transactions. For example, a plurality of orders may be placed using an easy ordering interface in response to a plurality of actuations of the easy ordering interface. A plurality of indications of actuation of an interface may be received by a system 101 and in response, respective orders may be fulfilled.

It should be recognized that while FIG. 9 illustrate one non-limiting example method, other embodiments may include any method desired which may include same or different actions in any desired order and/or number. It should be recognized that action of such a process may be performed by any entity as desired in various embodiments.

Some embodiments may include various methods and/or systems that may facilitate delivery. In some embodiments, facilitating delivery may include determining a delivery agent. Such a delivery agent may be a delivery agent of a merchant, a delivery agent of a user, a delivery agent of system 101, a third party delivery agent, and so on. In some embodiments, determining a delivery agent may include determining a delivery agent through an auction. In some embodiments, determining a delivery agent may include determining a delivery agent based on a price quote for the delivery by each of a plurality of delivery agents. In some embodiments, determining a delivery agent may include determining a delivery agent base don a time of delivery quote for each of a plurality of delivery agents. Some embodiments may use such a method to determine a most effective delivery agent for one or more orders. Some embodiments may include delivery agents bidding on an opportunity to make one or more deliveries.

Figure 10:
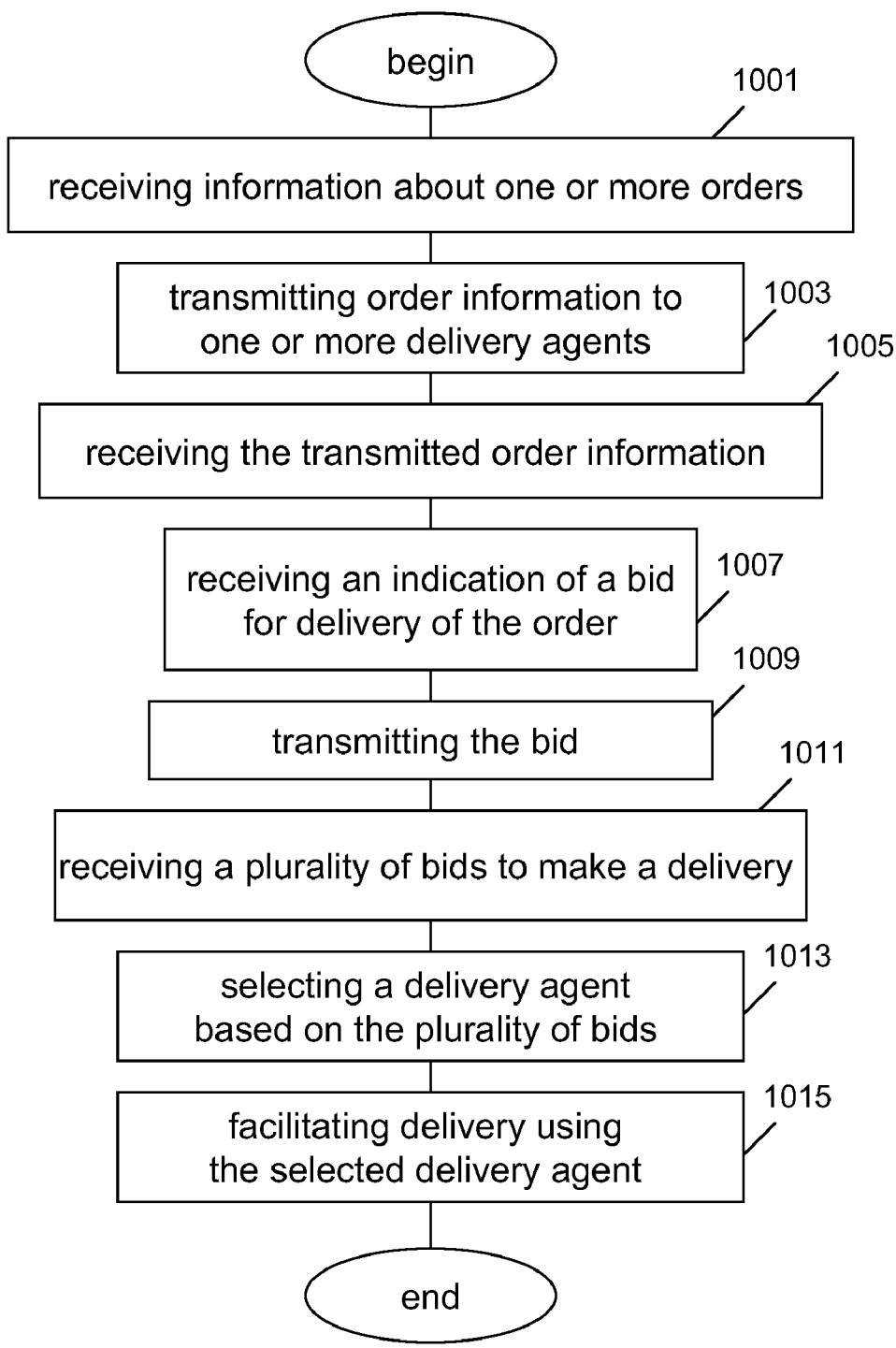
FIG. 10 depicts. yet another example method according to at least one embodiment of the systems disclosed herein.

It is recognized that a merchant may desire to provide delivery services to a user. It is recognized that a plurality of individuals may act as delivery agents independent of a single merchant. In some embodiments, an auction may be used to determine an effective delivery agent for an order from a particular merchant FIG. 10 illustrates one non-limiting example method that may be used in some embodiments. Such a process may be performed, for example by system 101, a user, a merchant, and/or any entity or combination of entities. Such a process may be performed by one or more servers and/or processors. Such a process may be used to determine a delivery agent for one or more orders.

As indicated at block 1001, some embodiments may include receiving information about one or more orders. Such information may include a location for delivery, a location for pickup, information about a merchant, information about items, a delivery time and/or time period, and so on. When location is referenced, it may include a location of a user, a location of a delivery, a location of a merchant, a location of a pickup, a location of a delivery agent, and/or any desired location. Various examples of order information and receiving are described elsewhere herein. Such an action may be performed, for example, by a user device, a merchant, system 101, and so on.

Some embodiments may include determining that an auction process for determining a delivery agent should be performed. Such a determination may include determining that no other delivery agent has already been contracted to perform the delivery. Such a determination may include determining that a merchant does not have their own delivery service. Such an auction process may include part of the method in FIG. 10. Such an auction process for example, may include receiving bids, and determining that a delivery agent should perform a delivery based on the bids.

As indicated at block 1003, some embodiments may include transmitting order information to one or more delivery agents. Such information may be transmitted to a plurality of delivery agents that are part of an auction system for a particular geographical area. Some embodiments may include providing order information to one or more delivery agents in any manner including transmission. Such information may and/or may not include all information about an order (e.g., some information such as identities may be kept hidden for privacy reasons). Delivery agents may register with such a service and indicate what types of orders to receive, when they operate, where they operate, a form to receive information in, and so on. Such transmitting may include transmitting via a central website that displays such information to delivery agents such as those that sign in. Such transmitting may include sending an email, a text message, a website, an electronic message, and so on. Such transmitting may include transmitting to a software program run by a delivery agent. Such transmitting may be performed in response to receiving the order information, may be performed in response to determining that an auction for a delivery agent should be performed, in response to determining that a merchant does not have a proprietary delivery agent, and so on.

In some embodiments, such transmitted information may include a desired level of specificity. For example such information may include exact information and/or inexact information regarding time, locations, and so on. For example, an indication of a location may include an exact location (e.g., an address), an approximate location (e.g., a cross street, a region, a distance (e.g., exact, approximate) from an other location, and so on).

As indicated at block 1005, some embodiments may include receiving the transmitted order information. Such information may be receiving by one or more delivery agents. Such information may be received, for example, by a program run by a delivery agent and displayed to the delivery agent through a user interface. Such information may be received by a delivery agent through a website or other such interface.

In some embodiments, a delivery agent may determine a bid to be placed regarding the delivery of the order. Such a bid may include a cost for making the delivery. Such a bid may include a time and/or time frame for making the delivery. The time and/or time frame may match and/or not match the time and/or time frame associated with an order. Such a bid may be made based on an availability of a delivery agent. For example, if a delivery service has one of a group of deliverers available at a time, the delivery service may place a bid on making the delivery. A cost of the bid may be based on a cost of performing the service, such as distance traveled by the agent to perform the service, risk taken to perform the service, and so on. A time may be based on an availability of a delivery agent and/or a distance to travel for the order. A computer program may be configured to calculate such information and determine the bid and place the bid in response to receiving such information and/or information about other obligation of a delivery service. A delivery agent may refer to an individual and/or a plurality of agents working together. Some embodiments may include entering information about a bid in a user interface, through an API, and so on.

In some embodiments, a portion of a bid may be based on a location. In some embodiments, for example, a portion of a bid may be based on a location of a delivery agent and/or employee of a delivery service (e.g., an employee that may perform the delivery). For example, in some embodiments, a price for a bid may be based on a distance that a employee may need to travel from a current location to a merchant location and then to a user location to perform a delivery. As another example, a time and/or time frame may be based on a location. For example, a time may be based on a distance that an employee may need to travel from a current location to a merchant location and then to a user location.

In some embodiments, a price may be based on any desired characteristic of an order and/or service to be provided. For example, such a price may be based on a quantity of food items, a weight of items, a cost of items, a risk of providing delivery (e.g., risk of being late, danger of a neighborhood, risk of being caught in traffic, and so on). It should be recognized that although examples are given in which a bid is based on cost, location, and other characteristics that a bid may be based on anything as desired.

As indicated at block 1007, some embodiments may include may include receiving an indication of a bid for delivery of the order. Such an indication may be received by a device of a delivery agent. Such an indication may be received in response to receiving information about the order. Such a bid may include a cost of performing a delivery, a time for completion of the delivery, and so on.

As indicated at block 1009, some embodiments may include transmitting the bid. Such transmitting may be performed in response to receiving the indication of the bid. Such transmitting may include transmitting from a delivery agent. Such transmitting may include transmitting to a user, a merchant, a system 101, and so on.

As indicated at block 1011, some embodiments may include receiving a plurality of bids to make a delivery. Such bids may be received in response to transmissions of the bids. Such bids may be received from delivery agents. Such bids may be received through a website. Such bids may include information about costs, times and/or time frames, and so on.

It should be recognized that any number of bids may be received from any number of delivery agents, that any number of delivery agents may determine, receive, transmit bids in any manner as desired in any embodiment.

In some embodiments, one or more bids may include an indication of a price. Such a price may include a price to be paid to the delivery agent if the bid is accepted and the delivery is performed.

In some embodiments, one or more bids may include an indication of a time and/or time frame. Such a time and/or time frame may include a time and/or time frame that a delivery agent agreed to perform the delivery if the bid is accepted.

As indicated at block 1013, some embodiments may include selecting a delivery agent based on the plurality of bids. Such a selection may be performed at an end of a time period for bidding. Such a selection may be performed when a bid with a desired property is received. Such a selection may be performed in response to receiving one or more bids. Such a selection may be performed by a system 101, a user, a merchant, and so on. Such a selection may be based on a cost associated with the bid. For example, a lowest cost bid may be selected. Such a selection may be based on a reputation of delivery agent. For example, a bid form an agent with a better reputation may be selected. Such a selection may be based on a time and/or time from associated with a bid. For example, a bid with a time and/or time frame that most closely matches a time and/or time frame associated with an order may be selected. In some embodiments any desired property may be used to based a selection. In some embodiments any combination of properties may be used to selected a delivery agent based on bids. For example, a formula that weighs various characteristics may be used to select a bid that results in the highest overall weight output by the formula when the various properties are input into the formula. Any method of determination may be used in any embodiment, including selection. Such selection may be based on one or more of the bids.

In some embodiments, such selection may include selecting a lowest priced bid. For example such selecting may include determining that a price associated with a selected delivery agent is lower than one or more other bids. In some embodiments, such selection may include selecting a bid that matches a time and/or time frame associated with an order. For example, such a selection may include determining that a time and/or time frame associated with a selected delivery agent matches a time and/or time frame of an order. It should be recognized that such examples of selection are given as examples only and that any desired method may be used. For example, some embodiments may include using an algorithm that includes at least one of a time and/or time frame associated with an order, a time and/or time frame associated with one or more bids, and/or a price associated with one or more bids. For example, such an algorithm may include a formula.

For example, such an algorithm may weigh time differences and cost to determine a lowest cost delivery agent that may delivery near a desired time.

As indicated at block 1015, some embodiments may include facilitating delivery using the selected delivery agent. Such an action may be performed in response to selecting the agent. Such an action may be performed by a merchant, a user, system 101, and so on. Facilitating delivery may include transmitting information about the delivery to the delivery agent, arranging payment, making a payment, and so on. Such information may include additional information to that transmitted to elicit a bid, such as order details, location information, and so on. Such facilitating may include transmitting a request to perform the delivery. A delivery service provider pay receive such information and facilitate delivery, for example by performing the delivery, by notifying an employee, and so on.

It should be recognized that although various example are given in terms of determining a delivery agent after an single order is placed, that some embodiments may include determining a delivery agent before an order is placed and/or for more than one order. For example, an auction may be used for a next order, for orders in a time period in the future, for a next set of orders, for orders in a geographic area, for orders in a slice of time in the future, for orders on particular days, for orders in a month, for a series of orders, for a group of orders, and so on.

It should be recognized that when a delivery agent is referenced herein that such a reference is given as a non-limiting example only. Some embodiments may include a delivery service provider with any number of employees. Some embodiments may include a delivery service provider that acts as an agent. Some embodiments may include a delivery service provider that acts as a principle.

It should be recognized that although various examples are given in which a delivery agent places one bid, that some embodiments may include any desired auction system. For example, a traditional auction may be used, a reverse auction may be used, a silent auction may be used, a secret auction may be used, an open auction may be used, and so on. In some embodiments, an auction may have a reserve price and/or time. In some embodiments, an auction may have a limited period of time. In some embodiments, a delivery agent may submit changes to a bid and/or updated bids. In some embodiments a delivery agent may be able to see information about competing bids. In some embodiments, information about other delivery agent bids may be provided to a delivery agent. In some embodiments more than one bid may be received from a delivery agent.

In some embodiments, for example, a delivery agent may receive an indication of a bid by another delivery agent. In response to receiving such an indication, the delivery agent may determine a bid to be placed. Such a bid may be a second bid by the delivery agent. Such a bid may be for a lower price than a first bid by the delivery agent. Such a bid may be for a better time than the first bid. Such a bid may be for a lower price and/or better time than the bid by the other delivery agent. Such a bid may be based on cost of providing the service. In response to determining such a bid, an indication may be transmitted.

It should be recognized that while FIG. 10 illustrate one non-limiting example method, other embodiments may include any method desired which may include same or different actions in any desired order and/or number. It should be recognized that action of such a process may be performed by any entity as desired in various embodiments.

It should be recognized that although various examples are given with multiple entities acting as intermediaries, that some embodiments may include no such intermediaries, more such intermediaries, ad/or different such intermediary. For example, some embodiments may include a distributed system. Some embodiments may include a system where a user, a payment processing service, and/or a system a system 101, and/or payment processing device perform any role that may have been performed by one of the others. For example, a user may directly communicate with a payment processing device, may perform payment processing, and so on. Such actions and/or other actions may be performed by any entity in any combination.

Various examples may refer to a system such as system 101. It should be recognized that such references are given as examples only and that system 101 and FIG. 1 are both given as examples only. Various embodiments may include any system(s) in any configuration and/or no system that may or may not include any characteristics similar to system 101 and any reference to system 101 may refer to any other system with or without such characteristics.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the scope of the invention. Accordingly, the foregoing description and drawings are by way of example only.

XII. Embodiments

The following should be understood as embodiments, not as claims.

A. A method comprising: receiving, by a computing device from a remote device of a user, an indication of an order for a plurality of food items from a restaurant; in response to receiving the indication of the order, determining, by the computing device, that an auction process should be used to determine a delivery service provider from a plurality of delivery service providers to provide a delivery service for the order; in response to determining that the auction process should be used, providing information about the order to the plurality of delivery service providers; receiving the information about the order by a first delivery service provider of the plurality of delivery service providers; in response to receiving the information by the first delivery service provider, determining, by the first delivery service provider, a first bid for providing the delivery service for the order by the first delivery service provider based on a cost to the first delivery service provider to provide the delivery service; in response to determining the first bid, transmitting the first bid from the first delivery service provider to the computing device; receiving the information about the order by a second delivery service provider of the plurality of delivery service providers; in response to receiving the information by the second delivery service provider, determining, by the second delivery service provider, a second bid for providing the delivery service for the order by the second delivery service provider; in response to determining the second bid, transmitting the second bid from the second delivery service provider to the computing device; determining, by the computing device, based on the first bid and second bid, that the first delivery service provider should provide the delivery service for the order, and in response to determining that the first delivery service provider should provide the delivery service, facilitating, by the computing device, delivery of the order to the user by the first delivery service provider.

B. An apparatus comprising: a tangible machine readable medium having stored thereon a plurality of instructions that when executed by a processor cause the processor to perform a method comprising: receiving, from a remote device of a user, an indication of an order for a plurality of food items from a restaurant; in response to receiving the indication of the order, determining that an auction process should be used to determine a delivery service provider from a plurality of delivery service providers to provide a delivery service for the order; in response to determining that the auction process should be used, providing information about the order to the plurality of delivery service providers; receiving a respective bid to provide the delivery service from each of the plurality of delivery service providers; determining, based on each of the respective bids, that a first delivery service provider of the plurality of delivery service providers should provide the delivery service for the order, and in response to determining that the first delivery service provider should provide the delivery service, facilitating delivery of the order to the user by the first delivery service provider.

B.1. The apparatus of claim B, in which determining that the auction process should be used includes determining that the restaurant does not have a proprietary delivery service.

B.2. The apparatus of claim B, in which the auction process includes receiving the bid and determining that the first delivery service provider of the plurality of delivery service providers should provide the delivery service.

B.3. The apparatus of claim B, in which the information is provided through at least one of an email, a website, and an electronic message.

B.4. The apparatus of claim B, in which facilitating delivery includes transmitting a request to perform the delivery.

B.5. The apparatus of claim B, in which facilitating delivery includes transmitting order details.

B.6. The apparatus of claim B, in which each bid identifies a price for delivery.

B.7. The apparatus of claim B, in which each bid identifies at least one of a time and a time frame for delivery.

B.8. The apparatus of claim B, in which the provided information includes a location of the restaurant and a location of the user.

B.9. The apparatus of claim B, in which the indication of the order includes an indication of at least one of a time and a time frame for delivery.

B.10. The apparatus of claim B, in which determining that the first delivery service provider should provide the delivery service includes determining that a price associated with the first delivery service provider is lower than other bids.

B.11. The apparatus of claim B, in which determining that the first delivery service provider should provide the delivery service includes determining that a bid associated with the first delivery service provider includes at least one of a time and a time frame that matches the order.

B.12. The apparatus of claim B, in which each bid includes a respective price and a respective at least one of a time and a time frame, and in which determining that the first delivery service provider should provide the delivery service includes determining based on an algorithm with inputs that include at least one of a time and a time frame associated with the order, the respective price and the respective at least one of the time and the time frame.

B.13. The apparatus of claim B, in which the method further comprises: providing information about each bid to the plurality of delivery service providers; and receiving more than one bid from at least one of the plurality of delivery service providers.

C. An apparatus comprising: a tangible machine readable medium having stored thereon a plurality of instructions that when executed by a processor of a delivery service provider cause the processor to perform a method comprising: receiving, from a remote device, information about an order to deliver a plurality of food items from a restaurant to a user; in response to receiving the information, determining a first bid for providing a delivery service for the order based on a cost to the delivery service provider to provide the delivery service; in response to determining the first bid, transmitting the first bid to the remote device; receiving an indication from the remote device that the delivery service provider has been selected to deliver the plurality of food items from the restaurant to the user; and in response to receiving the indication that the delivery service provider has been selected, facilitating the delivery of the plurality of food items from the restaurant to the user.

C.1. The apparatus of claim C, in which the information about the order includes at least one of a time and a time frame for delivery of the order.

C.2. The apparatus of claim C, in which the information includes a location of the user and a location of the restaurant.

C.3. The apparatus of claim C, in which the first bid includes a price for the delivery.

C.3.1. The apparatus of claim C.3, in which the price is based on a location of an employee of the delivery service provider, the location of the restaurant, and the location of the user.

C.3.2. The apparatus of claim C.3, in which the price is based on a cost of the food items.

C.3.3. The apparatus of claim C.3, in which the price is based on a risk of providing the delivery.

C.4. The apparatus of claim C, in which the first bid includes at least one of a time and a time frame for the delivery.

C.4.1. The apparatus of claim C.4, in which the at least one of the time and the time frame is based on a location of a employee of the delivery service provider, the location of the restaurant, and the location of the user.

C.5. The apparatus of claim C, in which facilitating the delivery includes notifying an employee of the delivery service provider.

C.6. The apparatus of claim C, in which the method further comprises: receiving an indication of a second bid made by another delivery service provider; in response to receiving the indication of the second bid, determining a third bid for providing a delivery service for the order; and in response to determining the third bid, transmitting the third bid to the remote device.

What is claimed is:
1. A method comprising:
receiving, by a computing device of a referral service from a remote device of a user, an indication of an order for a plurality of food items from a restaurant;
determining that the restaurant does not have a proprietary delivery service;
in response to receiving the indication of the order for the plurality of food items from the restaurant and determining that the restaurant does not have a proprietary delivery service, determining, by the computing device of the referral service, that an auction process should be used to determine a delivery service provider from a plurality of delivery service providers to provide a delivery service for the order;

in response to determining that the auction process should be used, providing information about the order to the plurality of delivery service providers;

receiving the information about the order by a first delivery service provider of the plurality of delivery service providers;

in response to receiving the information by the first delivery service provider, determining, by the first delivery service provider, a first bid for providing the delivery service for the order by the first delivery service provider based on a cost to the first delivery service provider to provide the delivery service;

in response to determining the first bid, transmitting the first bid from the first delivery service provider to the computing device;

receiving the information about the order by a second delivery service provider of the plurality of delivery service providers;

in response to receiving the information by the second delivery service provider, determining, by the second delivery service provider, a second bid for providing the delivery service for the order by the second delivery service provider;

in response to determining the second bid, transmitting the second bid from the second delivery service provider to the computing device;

determining, by the computing device, based on the first bid and second bid, that the first delivery service provider should provide the delivery service for the order, and in response to determining that the first delivery service provider should provide the delivery service, facilitating, by the computing device, delivery of the order to the user by the first delivery service provider.

2. An apparatus comprising: a non-transitory tangible machine readable medium having stored thereon a plurality of instructions that when executed by a processor of a referral service cause the processor to perform a method comprising:

receiving, from a remote device of a user, an indication of an order for a plurality of food items from a restaurant;

determining that the restaurant does not have a proprietary delivery service;

in response to receiving the indication of the order for the plurality of food items from the restaurant and determining that the restaurant does not have a proprietary delivery service, determining that an auction process should be used by the referral service to determine a delivery service provider from a plurality of delivery service providers to provide a delivery service for the order;

in response to determining that the auction process should be used, providing information about the order to the plurality of delivery service providers;

receiving a respective bid to provide the delivery service from each of the plurality of delivery service providers;

determining, based on each of the respective bids, that a first delivery service provider of the plurality of delivery service providers should provide the delivery service for the order, and in response to determining that the first delivery service provider should provide the delivery service, facilitating delivery of the order to the user by the first delivery service provider.

3. The apparatus of claim 2, in which the auction process includes receiving the bid and determining that the first delivery service provider of the plurality of delivery service providers should provide the delivery service.

4. The apparatus of claim 2, in which the information is provided through at least one of an email, a website, and an electronic message.

5. The apparatus of claim 2, in which facilitating delivery includes transmitting a request to perform the delivery.

6. The apparatus of claim 2, in which facilitating delivery includes transmitting order details.

7. The apparatus of claim 2, in which each bid identifies a price for delivery.

8. The apparatus of claim 2, in which each bid identifies at least one of a time and a time frame for delivery.

9. The apparatus of claim 2, in which the provided information includes a location of the restaurant and a location of the user.

10. The apparatus of claim 2, in which the indication of the order includes an indication of at least one of a time and a time frame for delivery.

11. The apparatus of claim 2, in which determining that the first delivery service provider should provide the delivery service includes determining that a price associated with the first delivery service provider is lower than other bids.

12. The apparatus of claim 2, in which determining that the first delivery service provider should provide the delivery service includes determining that a bid associated with the first delivery service provider includes at least one of a time and a time frame that matches the order.

13. The apparatus of claim 2, in which each bid includes a respective price and a respective at least one of a time and a time frame, and in which determining that the first delivery service provider should provide the delivery service includes determining based on an algorithm with inputs that include at least one of a time and a time frame associated with the order, the respective price and the respective at least one of the time and the time frame.

14. The apparatus of claim 2, in which the method further comprises:

providing information about each bid to the plurality of delivery service providers; and receiving more than one bid from at least one of the plurality of delivery service providers.

15. The apparatus of claim 2, In which each bid includes a bid to perform delivery for at least one of a plurality of orders and a period of time relative to the order, and in which determining that the first deliver service provider should provide the delivery service for the order include determining that the first delivery service provider should provider delivery services for the at least one of the plurality of orders and the period of time.

16. The apparatus of claim 2, in which the respective bid includes at least one of a time and a time frame for the delivery, in which the at least one of the time and the time frame is based on a location of an employee of the delivery service provider, the location of the restaurant, and the location of the user, and in which a price of the respective bid is based on a location of an employee of the delivery service provider, the location of the restaurant, the location of the user and a risk of providing the delivery.

17. An apparatus comprising: a non-transitory tangible machine readable medium having stored thereon a plurality of instructions that when executed by a processor of a delivery service provider cause the processor to perform a method comprising:

receiving, from a remote device, information about an order to deliver a plurality of food items from a restaurant to a user;

determining that the restaurant does not have a proprietary delivery service;

in response to receiving the information about the order to deliver the plurality of food items from the restaurant to the user and determining that the restaurant does not have a proprietary delivery service, determining a first bid from a delivery service provider for providing a delivery service for the order based on a cost to the delivery service provider to provide the delivery service;

in response to determining the first bid, transmitting the first bid to the remote device;

receiving an indication, based on the first bid, from the remote device that the delivery service provider has been selected to deliver the plurality of food items from the restaurant to the user; and in response to receiving the indication that the delivery service provider has been selected, facilitating the delivery of the plurality of food items from the restaurant to the user.

18. The apparatus of claim 17, in which the information about the order includes at least one of a time and a time frame for delivery of the order.

19. The apparatus of claim 17, in which the information includes a location of the user and a location of the restaurant.

20. The apparatus of claim 17, in which the first bid includes a price for the delivery.

21. The apparatus of claim 20, in which the price is based on a location of an employee of the delivery service provider, the location of the restaurant, and the location of the user.

22. The apparatus of claim 20, in which the price is based on a cost of the food items.

23. The apparatus of claim 20, in which the price is based on a risk of providing the delivery.

24. The apparatus of claim 23, in which the risk includes a risk of being stuck in traffic while making the delivery.

25. The apparatus of claim 17, in which the first bid includes at least one of a time and a time frame for the delivery.

26. The apparatus of claim 25, in which the at least one of the time and the time frame is based on a location of a employee of the delivery service provider, the location of the restaurant, and the location of the user.

27. The apparatus of claim 26, in which the price is based on a location of an employee of the delivery service provider, the location of the restaurant, and the location of the user and a risk of providing the delivery.

28. The apparatus of claim 17, in which facilitating the delivery includes notifying an employee of the delivery service provider.

29. The apparatus of claim 17, in which the method further comprises:

receiving an indication of a second bid made by another delivery service provider;

in response to receiving the indication of the second bid, determining a third bid for providing a delivery service for the order; and in response to determining the third bid, transmitting the third bid to the remote device.

* * * * *